United States Patent
Chen et al.

(10) Patent No.: US 10,320,464 B2
(45) Date of Patent: Jun. 11, 2019

(54) JOINT CHANNEL CORRECTION METHOD, RELATED APPARATUS, AND SYSTEM

(71) Applicant: Huawei Technologies Co., Ltd., Shenzhen, Guangdong (CN)

(72) Inventors: Weimin Chen, Changdu (CN); Li Wen, Reading (GB); Zhengzheng Li, Chengdu (CN); Lu Guan, Chengdu (CN); Huaizhi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/858,983

(22) Filed: Dec. 29, 2017

(65) Prior Publication Data

US 2018/0123666 A1    May 3, 2018

Related U.S. Application Data

(63) Continuation of application No. PCT/CN2016/087858, filed on Jun. 30, 2016.

(30) Foreign Application Priority Data

Jun. 30, 2015   (CN) .......................... 2015 1 0373271

(51) Int. Cl.
*H04L 27/28* (2006.01)
*H04B 7/06* (2006.01)
(Continued)

(52) U.S. Cl.
CPC ....... *H04B 7/0617* (2013.01); *H04L 25/0204* (2013.01); *H04L 25/0224* (2013.01); *H04W 40/16* (2013.01)

(58) Field of Classification Search
CPC ..... H04L 1/0618; H04L 1/06; H04L 25/0224; H04B 7/0417; H04W 24/02
(Continued)

(56) References Cited

U.S. PATENT DOCUMENTS

2012/0208584 A1*  8/2012  Liao .................. H04B 17/0007
                                                        455/509
2012/0252366 A1* 10/2012  Aoki .................... H04B 7/0617
                                                        455/63.1
(Continued)

FOREIGN PATENT DOCUMENTS

CN          102891708 A      1/2013
CN          103229471 A      7/2013
(Continued)

*Primary Examiner* — Khai Tran

(57) ABSTRACT

A joint channel correction method, an apparatus, and a system are disclosed. The joint channel correction method includes: sending a first joint channel correction instruction to a first RRU; sending a second joint channel correction instruction to a second RRU; receiving a result sent by the second RRU about reception of the first correction reference signal through X2 receive channels in X2 traffic channels; receiving a result sent by the first RRU about reception of the second correction reference signal through X1 receive channels in X1 traffic channels; and obtaining correction compensation coefficients of the X1 traffic channels and/or the X2 traffic channels through calculation. Technical solutions provided by embodiments of the present application help implement channel correction between RRUs without a channel self-correction function.

20 Claims, 6 Drawing Sheets

(51) Int. Cl.
*H04W 40/16* (2009.01)
*H04L 25/02* (2006.01)

(58) Field of Classification Search
USPC .................................. 375/267, 260; 370/252
See application file for complete search history.

(56) References Cited

U.S. PATENT DOCUMENTS

| | | |
|---|---|---|
| 2015/0085690 A1 | 3/2015 | Yi |
| 2015/0189669 A1 | 7/2015 | Huang et al. |
| 2015/0200740 A1 | 7/2015 | Yi et al. |
| 2016/0099762 A1 | 4/2016 | Wu et al. |
| 2016/0197745 A1 | 7/2016 | Yi et al. |
| 2106/0197745 | 7/2016 | Yi et al. |

FOREIGN PATENT DOCUMENTS

| | | |
|---|---|---|
| CN | 103338167 A | 10/2013 |
| CN | 103428125 A | 12/2013 |
| CN | 103595665 A | 2/2014 |
| CN | 103716075 A | 4/2014 |
| CN | 103905353 A | 7/2014 |
| CN | 104244296 A | 12/2014 |
| CN | 104378775 A | 2/2015 |
| CN | 104468425 A | 3/2015 |
| EP | 2897301 A1 | 7/2015 |
| EP | 2991412 A1 | 3/2016 |
| WO | 2014040354 A1 | 3/2014 |
| WO | 2014183662 A1 | 11/2014 |
| WO | 2015035948 A1 | 3/2015 |

\* cited by examiner

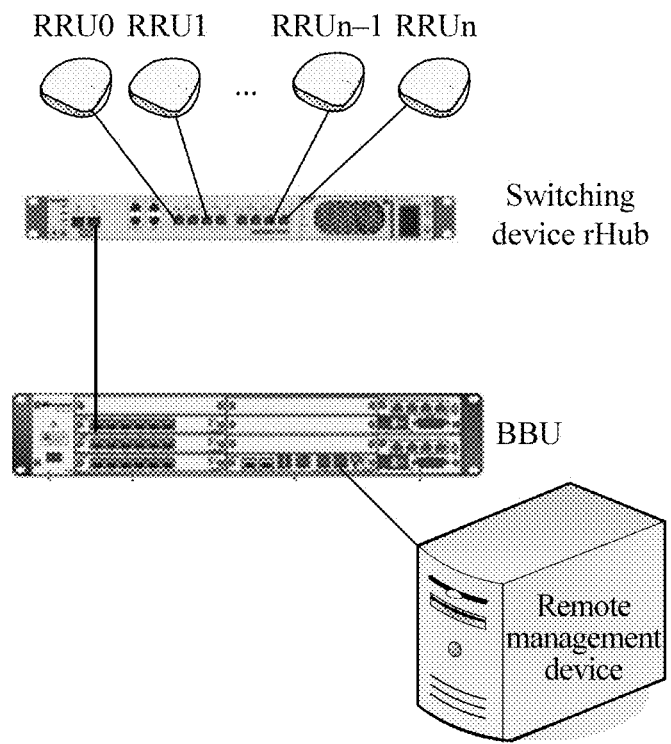
FIG. 1-a
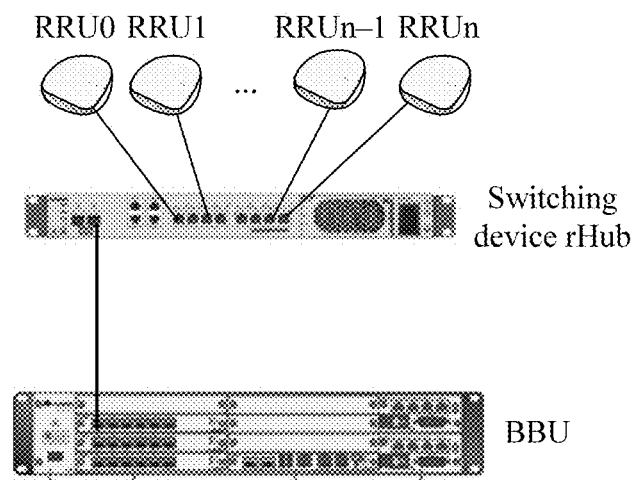
FIG. 1-b

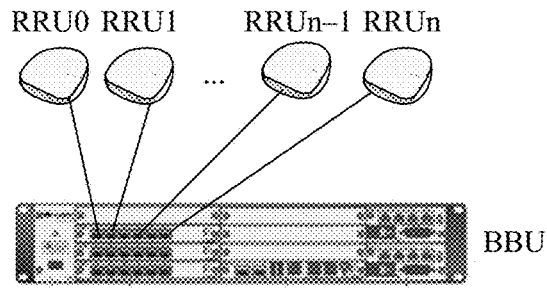
FIG. 1-c
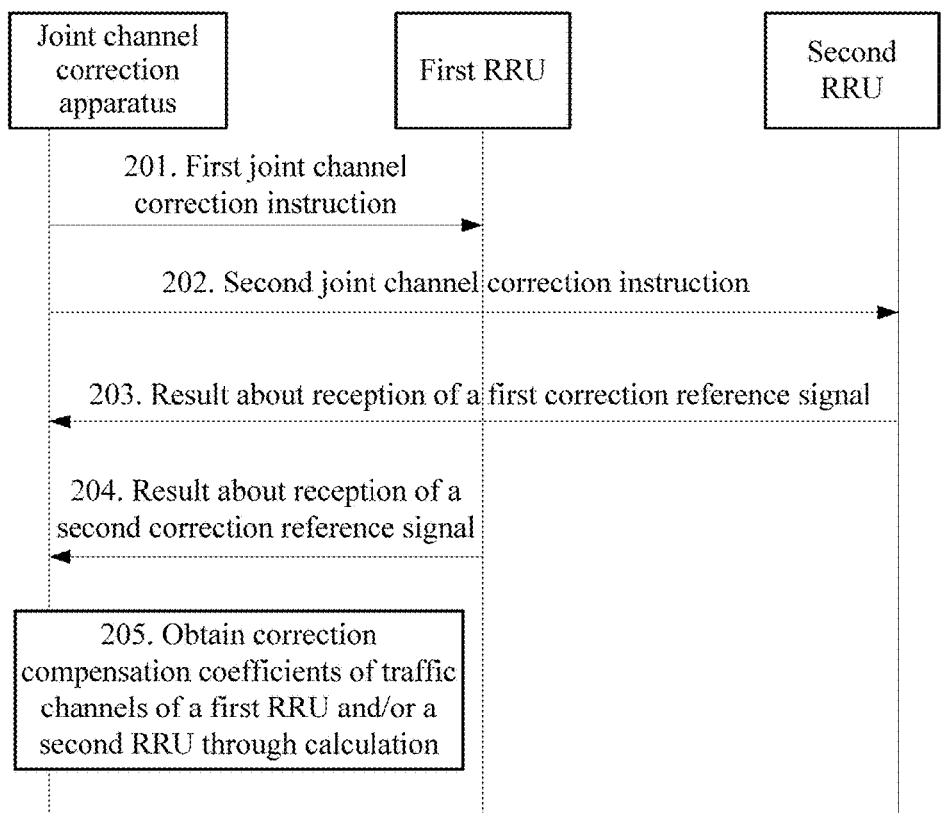
FIG. 2

JOINT CHANNEL CORRECTION METHOD, RELATED APPARATUS, AND SYSTEM

CROSS-REFERENCE TO RELATED APPLICATIONS

This application is a continuation of International Application No. PCT/CN2016/087858, filed on Jun. 30, 2016, which claims priority to Chinese Patent Application No. 201510373271.6, filed on Jun. 30, 2015, both of which are hereby incorporated by reference in their entireties.

TECHNICAL FIELD

The present application relates to the field of communications technologies, and in particular, to a joint channel correction method, a related apparatus, and a system.

BACKGROUND

In an indoor communication scenario, a distance between indoor base stations is usually very small (within 30 m). If each base station in an area is configured as an independent cell, interference between the cells is severe. Although a single frequency network configuration may cancel interference between independent cells, spectrum utilization is low.

Multi-user beamforming (MU-BF) is a means for improving spectrum utilization, but can hardly be applied due to limitations of existing products. This is because an existing single base station generally has only two transmit antennas due to a limited volume, and has a limited degree of freedom in space, and it is difficult to find an appropriate multi-user weight. It is found through research that, using multiple base stations jointly for transmission can increase a quantity of transmit antennas, increase the degree of freedom in space, and therefore find multiple orthogonal weights, and can further implement multi-user spatial multiplexing and improve spectrum utilization.

Each radio frequency channel in a remote radio unit (RRU) configured to receive and transmit signals in a base station is made up of independent hardware. This causes responses introduced on uplink and downlink channels in each radio frequency channel to be different, and affects performance of downlink beamforming. Therefore, the uplink and downlink channels in each radio frequency channel need to be corrected by means of channel correction, so that ratios of channel response estimated values of uplink channels to channel response estimated values of downlink channels in all radio frequency channels in the RRU are the same, and that accuracy of downlink beamforming is ensured as much as possible.

Through research and practice, the inventor of the present application finds that although there are some methods for channel correction between multiple RRUs currently, generally two steps are required for implementing channel correction between the multiple RRUs in the existing methods. First, channel self-correction in each RRU needs to be implemented by using a dedicated correction reference channel in each RRU, and then channel correction between the RRUs is performed. For an RRU that has no correction reference channel (namely, an RRU that has no channel self-correction function), the existing channel correction mechanism cannot implement channel correction between multiple RRUs.

SUMMARY

Embodiments of the present application provide a joint channel correction method, a related apparatus, and a system to implement channel correction between RRUs without a channel self-correction function.

A first aspect of the embodiments of the present application provides a joint channel correction method, including: sending a first joint channel correction instruction to a first RRU, where the first joint channel correction instruction is used to trigger the first RRU to send a first correction reference signal through X1 transmit channels in X1 traffic channels of the first RRU; sending a second joint channel correction instruction to a second RRU, where the second joint channel correction instruction is used to trigger the second RRU to send a second correction reference signal through X2 transmit channels in X2 traffic channels of the second RRU; receiving a result sent by the second RRU about reception of the first correction reference signal through X2 receive channels in the X2 traffic channels, and receiving a result sent by the first RRU about reception of the second correction reference signal through X1 receive channels in the X1 traffic channels; and obtaining correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels.

X1 is an integer greater than 1. X2 is an integer greater than 1.

For example, X1 may be equal to 7, 17, 2, 3, 4, 5, 6, 8, 12, 16, 19, 32, 50, or another value.

For example, X2 may be equal to 9, 11, 2, 3, 4, 5, 6, 8, 12, 15, 21, 30, 50, or another value.

A traffic channel includes a transmit channel and a receive channel. The transmit channel and the receive channel included in the traffic channel share an antenna. The traffic channel is a channel that may be used to receive and transmit signals. Different traffic channels may correspond to different antennas.

The X1 traffic channels may be some or all traffic channels of the first RRU.

The X2 traffic channels may be some or all traffic channels of the second RRU.

For example, the first RRU and/or the second RRU have/has no self-correction function.

The first RRU and the second RRU may be RRUs of a same base station or different base stations.

The correction compensation coefficients may be used to compensate for inconsistency of channel responses between the receive channels and the transmit channels in the traffic channels.

As can be seen, in solutions of some embodiments of the present disclosure, a joint channel correction apparatus sends a first joint channel correction instruction to a first RRU, triggering the first RRU to send a first correction reference signal through X1 transmit channels in X1 traffic channels of the first RRU, and sends a second joint channel correction instruction to a second RRU, triggering the second RRU to send a second correction reference signal through X2 transmit channels in X2 traffic channels of the second RRU. Because the joint channel correction apparatus receives and transmits the correction reference signals by using the traffic channels of the first RRU and the second RRU, and obtains correction compensation coefficients of the traffic channels of the first RRU and/or the traffic channels of the second RRU through calculation based on the correction reference signals received and transmitted by the first RRU and the second RRU through the traffic channels, by using the multi-RRU joint channel correction mechanism, even if the first RRU and the second RRU have no channel correction reference channel (that is, have no channel self-correction function), channel correction between the first RRU and the second RRU can also be implemented. Obviously, some technical solutions provided by the embodiments of this application have higher universal applicability in channel correction.

It may be understood that, all steps of the joint channel correction method may be performed and completed by one execution entity. Certainly, the steps of the joint channel correction method may also be performed and completed by at least two devices separately in coordination.

For example, a switching device or a baseband unit BBU or a remote management device may send the first joint channel correction instruction to the first RRU. For example, the switching device or the BBU or the remote management device may send the second joint channel correction instruction to the second RRU.

For example, the switching device or the BBU or the remote management device may receive the result sent by the second RRU about reception of the first correction reference signal through the X2 receive channels in the X2 traffic channels. For example, the switching device or the BBU or the remote management device may receive the result sent by the first RRU about reception of the second correction reference signal through the X1 receive channels in the X1 traffic channels.

For example, the switching device or the BBU or the remote management device may obtain the correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels.

It may be understood that, because entities performing steps related to joint channel correction may be relatively flexible and changeable in this implementation solution, this helps extend an application scenario and an application scope of channel correction, and helps improve a situation in which channel correction is limited due to limited processing performance of some components.

A second aspect of the embodiments of the present application further provides a joint channel correction apparatus, where the joint channel correction apparatus may be configured to perform any joint channel correction method provided by the embodiments of the present application. For example, the joint channel correction apparatus may include:

a sending unit, configured to send a first joint channel correction instruction to a first RRU, where the first joint channel correction instruction is used to trigger the first RRU to send a first correction reference signal through X1 transmit channels in X1 traffic channels of the first RRU; where the sending unit is further configured to send a second joint channel correction instruction to a second RRU, where the second joint channel correction instruction is used to trigger the second RRU to send a second correction reference signal through X2 transmit channels in X2 traffic channels of the second RRU;

a receiving unit, configured to receive a result sent by the second RRU about reception of the first correction reference signal through X2 receive channels in the X2 traffic channels, and receive a result sent by the first RRU about reception of the second correction reference signal through X1 receive channels in the X1 traffic channels; and a processing unit, configured to obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

A third aspect of the embodiments of the present application further provides a communications system, including a remote management device, a first remote radio unit RRU, and a second RRU. Entities in the communications system may cooperate in performing the joint channel correction method provided by the embodiments of the present application.

For example, the remote management device is configured to: send a first joint channel correction instruction to the first RRU, where the first joint channel correction instruction is used to trigger the first RRU to send a first correction reference signal through X1 transmit channels in X1 traffic channels of the first RRU; send a second joint channel correction instruction to the second RRU, where the second joint channel correction instruction is used to trigger the second RRU to send a second correction reference signal through X2 transmit channels in X2 traffic channels of the second RRU; receive a result sent by the second RRU about reception of the first correction reference signal through X2 receive channels in the X2 traffic channels, and receive a result sent by the first RRU about reception of the second correction reference signal through X1 receive channels in the X1 traffic channels; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

The base station mentioned in the solution of each embodiment of this application may be, for example, an indoor base station or another type of base station.

A fourth aspect of the embodiments of the present application further provides a base station, including a switching device and a first remote radio unit RRU. Entities in the base station may cooperate in performing the joint channel correction method provided by the embodiments of the present application.

For example, the switching device is configured to: send a first joint channel correction instruction to the first RRU, where the first joint channel correction instruction is used to trigger the first RRU to send a first correction reference signal through X1 transmit channels in X1 traffic channels of the first RRU; send a second joint channel correction instruction to a second RRU, where the second joint channel correction instruction is used to trigger the second RRU to send a second correction reference signal through X2 transmit channels in X2 traffic channels of the second RRU; receive a result sent by the second RRU about reception of the first correction reference signal through X2 receive channels in the X2 traffic channels, and receive a result sent by the first RRU about reception of the second correction reference signal through X1 receive channels in the X1 traffic channels; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

A fifth aspect of the embodiments of the present application further provides a base station, including a baseband unit and a first remote radio unit RRU. Entities in the base station may cooperate in performing the joint channel correction method provided by the embodiments of the present application.

For example, the baseband unit is configured to: send a first joint channel correction instruction to the first RRU, where the first joint channel correction instruction is used to trigger the first RRU to send a first correction reference signal through X1 transmit channels in X1 traffic channels of the first RRU; send a second joint channel correction instruction to a second RRU, where the second joint channel correction instruction is used to trigger the second RRU to send a second correction reference signal through X2 transmit channels in X2 traffic channels of the second RRU; receive a result sent by the second RRU about reception of the first correction reference signal through X2 receive channels in the X2 traffic channels, and receive a result sent by the first RRU about reception of the second correction reference signal through X1 receive channels in the X1 traffic channels; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

A sixth aspect of the embodiments of the present application further provides a base station, including a switching device, a baseband unit, and a first RRU. Entities in the base station may cooperate in performing the joint channel correction method provided by the embodiments of the present application.

For example, the switching device is configured to: send a first joint channel correction instruction to the first RRU, where the first joint channel correction instruction is used to trigger the first RRU to send a first correction reference signal through X1 transmit channels in X1 traffic channels of the first RRU; send a second joint channel correction instruction to a second RRU, where the second joint channel correction instruction is used to trigger the second RRU to send a second correction reference signal through X2 transmit channels in X2 traffic channels of the second RRU; and receive a result sent by the second RRU about reception of the first correction reference signal through X2 receive channels in the X2 traffic channels, and receive a result sent by the first RRU about reception of the second correction reference signal through X1 receive channels in the X1 traffic channels; and the baseband unit is configured to obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

A seventh aspect of the embodiments of the present application further provides a joint channel correction apparatus, where the apparatus may include a transceiver and a processor.

The transceiver is configured to send a first joint channel correction instruction to a first RRU, where the first joint channel correction instruction is used to trigger the first RRU to send a first correction reference signal through X1 transmit channels in X1 traffic channels of the first RRU.

The transceiver is further configured to send a second joint channel correction instruction to a second RRU, where the second joint channel correction instruction is used to trigger the second RRU to send a second correction reference signal through X2 transmit channels in X2 traffic channels of the second RRU.

The transceiver is further configured to receive a result sent by the second RRU about reception of the first correction reference signal through X2 receive channels in the X2 traffic channels, and receive a result sent by the first RRU about reception of the second correction reference signal through X1 receive channels in the X1 traffic channels.

The processor is configured to obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

The joint channel correction apparatus, for example, may be a baseband unit, a remote management device, or a switching device in a base station.

In some possible implementations of the present application, for example, the first RRU and the second RRU are RRUs serving same UE. It may be understood that, the RRUs serving the same UE are grouped into one RRU cluster. If correction is performed between RRUs in a same RRU cluster, that is, a quantity of RRUs mutually corrected is appropriately limited, this helps reduce correction complexity to some extent.

In some possible implementations of the present application, the first joint channel correction instruction further indicates a time resource and/or a frequency resource for sending the first correction reference signal on the X1 transmit channels in the X1 traffic channels of the first RRU, and the second joint channel correction instruction further indicates a time resource and/or a frequency resource for receiving the first correction reference signal on the X2 receive channels in the X2 traffic channels of the second RRU.

In some possible implementations of the present application, the second joint channel correction instruction further indicates a time resource and/or a frequency resource for sending the second correction reference signal on the X2 transmit channels in the X2 traffic channels of the second RRU, and the first joint channel correction instruction further indicates a time resource and/or a frequency resource for receiving the second correction reference signal on the X1 receive channels in the X1 traffic channels of the first RRU.

It may be understood that, if the joint channel correction instructions are used to express the time resources for receiving and transmitting the correction reference signals, this helps improve time coordination in signal dual-reception and dual-transmission, and helps prevent receivers from also receiving signals on invalid time resources.

It may be understood that, if the joint channel correction instructions are used to express the frequency resources for receiving and transmitting the correction reference signals, this helps improve frequency resource coordination in signal dual-reception and dual-transmission, and helps prevent the receivers from also receiving signals on invalid frequency resources.

In some possible implementations of the present application, the first joint channel correction instruction carries the first correction reference signal. In some possible implementations of the present application, the second joint channel correction instruction carries the second correction reference signal.

In some possible implementations of the present application, the obtaining correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels includes: obtaining channel response estimated values between the X1 transmit channels and the X2 receive channels through calculation according to the first correction reference signal and the result about reception of the first correction reference signal through the X2 receive channels; obtaining channel response estimated values between the X2 transmit channels and the X1 receive channels through calculation according to the second correction reference signal and the result about reception of the second correction reference signal through the X1 receive channels; and obtaining the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels.

In some possible implementations of the present application, the channel response estimated values are expressed by using the following formula:

$$H_{RRU_iRx_k\text{-}RRU_jTx_m} = H_{RRU_iRx_k} H_{RRU_iRx_k\text{-}RRU_jTx_m}^{Air} H_{RRU_jTx_m},$$

where $H_{RRU_iRx_k\text{-}RRU_jTx_m}$ indicates a channel response estimated value between a receive channel in a $k^{th}$ traffic channel of an $i^{th}$ RRU and a transmit channel in an $m^{th}$ traffic channel of a $j^{th}$ RRU;

$H_{RRU_iRx_k\text{-}RRU_jTx_m}^{Air}$ indicates a channel response estimated value on an air interface between the receive channel in the $k^{th}$ traffic channel of the $i^{th}$ RRU and the transmit channel in the $m^{th}$ traffic channel of the $j^{th}$ RRU; and $H_{RRU_iRx_k}$ indicates a channel response estimated value of the receive channel in the $k^{th}$ traffic channel of the $i^{th}$ RRU, and $H_{RRU_jTx_m}$ indicates a channel response estimated value of the transmit channel in the $m^{th}$ traffic channel of the $j^{th}$ RRU.

In some possible implementations of the present application, the obtaining the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels may include: obtaining the correction compensation coefficients of the X2 traffic channels through calculation according to the channel response estimated values between the X1 transmit channels and the X2 receive channels and the channel response estimated values between the X2 transmit channels and the X1 receive channels by using the following formula:

$$\alpha_{RRU_ik\text{-}RRU_jm} =$$

$$\frac{H_{RRU_iRx_k\text{-}RRU_jTx_m}}{H_{RRU_jRx_m\text{-}RRU_iTx_k}} = \frac{H_{RRU_iRx_k} H_{RRU_iRx_k\text{-}RRU_jTx_m}^{Air} H_{RRU_jTx_m}}{H_{RRU_jRx_m} H_{RRU_jRx_m\text{-}RRU_iTx_k}^{Air} H_{RRU_iTx_k}} =$$

$$\frac{H_{RRU_iRx_k} H_{RRU_jTx_m}}{H_{RRU_jRx_m} H_{RRU_iTx_k}} = \frac{\frac{H_{RRU_iRx_k}}{H_{RRU_iTx_k}}}{\frac{H_{RRU_jRx_m}}{H_{RRU_jTx_m}}} = \frac{\mu_{RRU_ik}}{\mu_{RRU_jm}},$$

where $\alpha_{RRU_ik\text{-}RRU_jm}$ indicates a correction compensation coefficient between a $k^{th}$ traffic channel of an $i^{th}$ RRU and an $m^{th}$ traffic channel of a $j^{th}$ RRU; and $\mu_{RRU_ik}$ indicates a ratio of a channel response estimated value of a receive channel to that of a transmit channel in the $k^{th}$ traffic channel of the $i^{th}$ RRU, and $\mu_{RRU_jm}$ indicates a ratio of a channel response estimated value of a receive channel to that of a transmit channel in the $m^{th}$ traffic channel of the $j^{th}$ RRU.

In some possible implementations of the present application, the obtaining the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels may further include: obtaining the correction compensation coefficients of the X1 traffic channels by using the following formula:

$$\alpha_{RRU_ik\text{-}RRU_in} = \frac{\frac{H_{RRU_iRx_k\text{-}RRU_jTx_m}}{H_{RRU_jRx_m\text{-}RRU_iTx_k}}}{\frac{H_{RRU_iRx_n\text{-}RRU_jTx_m}}{H_{RRU_jRx_m\text{-}RRU_iTx_n}}} = \frac{\alpha_{RRU_ik\text{-}RRU_jm}}{\alpha_{RRU_in\text{-}RRU_jm}} = \frac{\mu_{RRU_ik}}{\mu_{RRU_in}},$$

where $\alpha_{RRU_ik\text{-}RRU_in}$ indicates a correction compensation coefficient between a $k^{th}$ traffic channel of an $i^{th}$ RRU and an $n^{th}$ traffic channel of the $i^{th}$ RRU; and $\mu_{RRU_in}$ indicates a ratio of a channel response estimated value of a receive channel to that of a transmit channel in the $n^{th}$ traffic channel of the $i^{th}$ RRU.

In addition, the embodiments of the present application further provide a computer readable storage medium, where the computer readable storage medium stores program code for performing the joint channel correction method. The program code includes an instruction for performing the joint channel correction method.

BRIEF DESCRIPTION OF DRAWINGS

To describe the technical solutions in the embodiments of the present application. Apparently, the accompanying drawings in the following description show merely some embodiments of the present application, and a person of ordinary skill in the art may still derive other drawings from these accompanying drawings without creative efforts.

FIG. 1-a is a schematic diagram of a network architecture including a base station and a remote management device according to an embodiment of the present application;

FIG. 1-b and FIG. 1-c are two schematic architecture diagrams of base stations according to an embodiment of the present application;

FIG. 2 is a schematic flowchart of a joint channel correction method according to an embodiment of the present application;

DESCRIPTION OF EMBODIMENTS

Embodiments of the present application provide a joint channel correction method and a related apparatus to implement channel correction between RRUs without a channel self-correction function.

In the specification, claims, and accompanying drawings of the present application, the terms "including", "having", and any other variations thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. In addition, the terms "first", "second", "third", and so on are intended to distinguish between different objects, and not used to describe a particular order.

Figure 11:
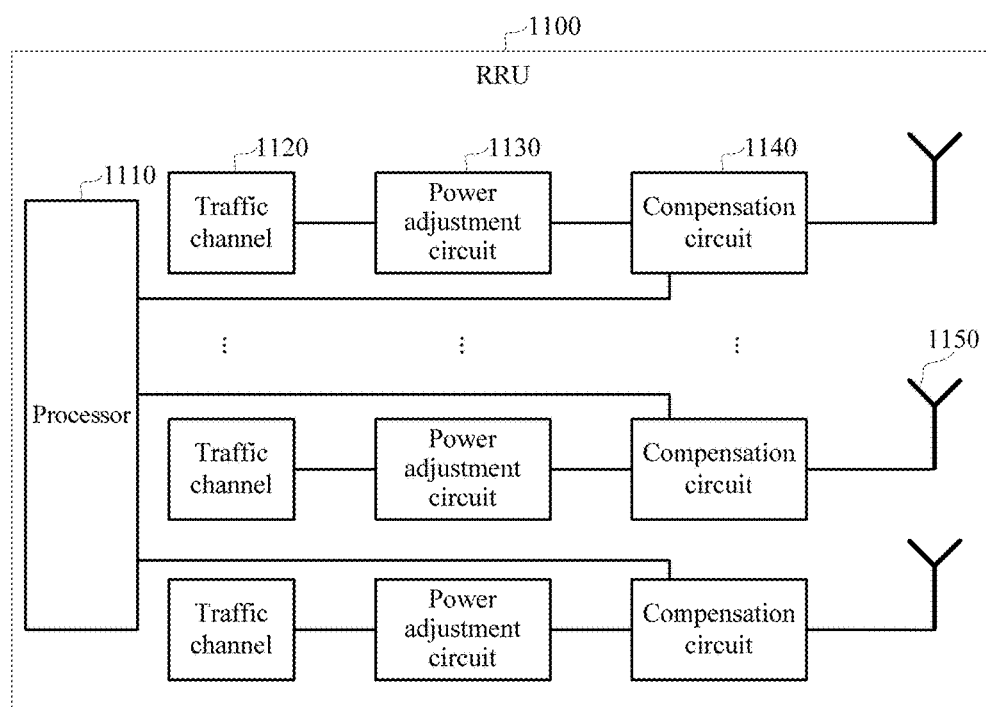
FIG. 11 is a schematic diagram of an RRU according to an embodiment of the present application.

Referring to FIG. 1-a to FIG. 1-c, FIG. 1-a to FIG. 1-c are several schematic architecture diagrams of base stations according to an embodiment of the present application. A base station includes a baseband unit (BBU) and several RRUs. FIG. 11-b shows interconnection between a BBU and RRUs by using a switching device (for example, a hub (rHub, remote Hub)). The switching device in this embodiment of the present application is a switching device configured to connect the BBU and the RRUs. An RRU in an indoor base station may also be referred to as a pico RRU (pRRU). Referring to FIG. 1-a, a base station may be further connected to a remote management device, and the remote management device may also participate (dominate or assist) in a multi-RRU joint channel correction process. The remote management device may be a network management server, a cloud computing center, or another device that can remotely manage the base station.

The technical solution in this embodiment of the present application may be specifically implemented based on the architectures illustrated in FIG. 1-a to FIG. 1-c or other variations thereof.

The following first illustrates a joint channel correction method performed by a single execution entity. The single execution entity may be a switching device (for example, an rHub), a baseband unit (BBU), a remote management device, or the like, all of which are referred to as a joint channel correction apparatus.

As illustrated in FIG. 2, a multi-RRU joint channel correction method provided by an embodiment of the present application may include the following steps.

S201. A joint channel correction apparatus sends a first joint channel correction instruction to a first RRU.

The first joint channel correction instruction is used to trigger the first RRU to send a first correction reference signal through X1 transmit channels in X1 traffic channels of the first RRU. The first RRU is an RRU that has no self-correction function.

S202. The joint channel correction apparatus sends a second joint channel correction instruction to a second RRU.

The second joint channel correction instruction is used to trigger the second RRU to send a second correction reference signal through X2 transmit channels in X2 traffic channels of the second RRU. The second RRU is an RRU that has no self-correction function.

A traffic channel includes a transmit channel and a receive channel. The transmit channel and the receive channel included in the traffic channel share an antenna. The traffic channel is a channel that may be used to receive and transmit signals. Different traffic channels may correspond to different antennas.

The first RRU and the second RRU may belong to a same base station or may belong to different base stations. For example, the first RRU and the second RRU serve same UE, that is, joint channel correction may be performed between several RRUs serving the same UE.

S203. The joint channel correction apparatus receives a result sent by the second RRU about reception of the first correction reference signal through X2 receive channels in the X2 traffic channels.

S204. The joint channel correction apparatus receives a result sent by the first RRU about reception of the second correction reference signal through X1 receive channels in the X1 traffic channels.

S205. The joint channel correction apparatus obtains correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels.

The correction compensation coefficients of the X1 traffic channels may be used to perform correction compensation for signals received and transmitted on the X1 traffic channels. The correction compensation coefficients of the X2 traffic channels may be used to perform correction compensation for signals received and transmitted on the X2 traffic channels.

X1 is an integer greater than 1. X2 is an integer greater than 1.

For example, X1 may be equal to 7, 17, 2, 3, 4, 5, 6, 8, 12, 16, 19, 32, 50, or another value.

For example, X2 may be equal to 9, 11, 2, 3, 4, 5, 6, 8, 12, 15, 21, 30, 50, or another value.

The X1 traffic channels may be some or all traffic channels of the first RRU.

The X2 traffic channels may be some or all traffic channels of the second RRU.

It should be noted that, steps S201 to S205 performed by a same device are mainly described in the foregoing example. Certainly, the steps may also be performed by multiple devices in coordination. For example, all the steps 201 to 205 may be performed by a switching device (for example, an rHub), a baseband unit (BBU), or a remote management device. Alternatively, steps 201 to 204 may be performed by a switching device (for example, an rHub), but step 205 may be performed by a baseband unit BBU or a remote management device. Certainly, a manner of performing by multiple devices in coordination is not limited to the foregoing example.

It may be understood that, because entities performing steps related to joint channel correction may be relatively flexible and changeable in this implementation solution, this helps extend an application scenario and an application scope of channel correction, and helps improve a situation in which channel correction is limited due to limited processing performance of some components.

The switching device mentioned in each embodiment of this application is a device that is located in a base station and is used to exchange data between the BBU and the RRU, for example, may be specifically a hub (rHub). The remote management device mentioned in each embodiment of this application is connected to the base station through a network. The remote management device is a device that can perform remote management. The remote management device, for example, may be a network management server, a cloud computing center, or another device that can remotely manage the base station.

Optionally, the first joint channel correction instruction carries the first correction reference signal. That is, for example, the first correction reference signal may be transferred to the first RRU by using the first joint channel correction instruction, or certainly, the first correction reference signal may be transferred to the first RRU by using another instruction, or the first RRU may prestore the first correction reference signal.

Optionally, the second joint channel correction instruction carries the second correction reference signal. That is, for example, the second correction reference signal may be transferred to the second RRU by using the second joint channel correction instruction, or certainly, the second correction reference signal may be transferred to the second RRU by using another instruction, or the second RRU may prestore the second correction reference signal.

In addition, the first correction reference signal may not be carried in the first joint channel correction instruction, but may be sent independently of the first joint channel correction instruction. The second correction reference signal may not be carried in the second joint channel correction instruction, but may be sent independently of the second joint channel correction instruction.

Optionally, the first joint channel correction instruction may further carry an identity of the first RRU (the identity of the first RRU, for example, may include a first RRU number and a cell number). That is, for example, the first RRU may be identified by the corresponding cell number and RRU number. In addition, the first joint channel correction instruction may further carry numbers of antennas corresponding to the X1 traffic channels. That is, the numbers of the antennas corresponding to the X1 traffic channels may be carried in the first joint channel correction instruction to indicate that the X1 traffic channels of the first RRU receive or transmit the correction reference signal.

Optionally, the second joint channel correction instruction may further carry an identity of the second RRU (the identity of the second RRU, for example, may include a second RRU number and a cell number). That is, for example, the second RRU may be identified by the corresponding cell number and RRU number. In addition, the second joint channel correction instruction may further carry numbers of antennas corresponding to the X2 traffic channels. That is, the numbers of the antennas corresponding to the X2 traffic channels may be carried in the second joint channel correction instruction to indicate that the X2 traffic channels of the second RRU receive or transmit the correction reference signal.

For example, a value range of cell numbers may be 0-503. A value range of RRU numbers, for example, may be 0-95.

Optionally, the first joint channel correction instruction further indicates a time resource and/or a frequency resource for sending the first correction reference signal on the X1 transmit channels in the X1 traffic channels of the first RRU, and the second joint channel correction instruction further indicates a time resource and/or a frequency resource for receiving the first correction reference signal on the X2 receive channels in the X2 traffic channels of the second RRU. That is, by using the first joint channel correction instruction and the second joint channel correction instruction, the time resource and/or the frequency resource for transmitting the first correction reference signal by the first RRU and the time resource and/or the frequency resource for receiving the first correction reference signal by the second RRU may be dynamically agreed upon. This helps the time resource and/or the frequency resource for transmitting the first correction reference signal by the first RRU accurately match the time resource and/or the frequency resource for receiving the first correction reference signal by the second RRU. Certainly, the first RRU or the second RRU may also transmit or receive the first correction reference signal according to a default time resource and/or frequency resource. In this case, the two parties do not need to agree upon the resource by using the joint channel correction instructions.

Optionally, the second joint channel correction instruction further indicates a time resource and/or a frequency resource for sending the second correction reference signal on the X2 transmit channels in the X2 traffic channels of the second RRU, and the first joint channel correction instruction further indicates a time resource and/or a frequency resource for receiving the second correction reference signal on the X1 receive channels in the X1 traffic channels of the first RRU. That is, by using the first joint channel correction instruction and the second joint channel correction instruction, the time resource and/or the frequency resource for receiving the second correction reference signal by the first RRU and the time resource and/or the frequency resource for transmitting the second correction reference signal by the second RRU may be dynamically agreed upon. This helps the time resource and/or the frequency resource for receiving the second correction reference signal by the first RRU accurately match the time resource and/or the frequency resource for transmitting the second correction reference signal by the second RRU. Certainly, the first RRU or the second RRU may also receive or transmit the second correction reference signal according to a default time resource and/or frequency resource. In this case, the two parties do not need to agree upon the resource by using the joint channel correction instructions.

Optionally, the time resource for receiving or transmitting the correction reference signal (for example, the first correction reference signal or the second correction reference signal) may be determined by using a radio frame number, a subframe number, a transmission symbol number, and the like jointly. For example, the joint channel correction instruction may carry the radio frame number, the subframe number, and the transmission symbol number to indicate the time resource for receiving or transmitting the correction reference signal. A value range of the radio frame number, for example, may be 0-1023. A value range of the subframe number, for example, may be 0-9. A value range of the transmission symbol number, for example, may be 0-13. For different communications systems, value ranges of the radio frame number, the subframe number, and the transmission symbol number may not be the same. The foregoing ranges are only examples.

Optionally, the frequency resource for receiving or transmitting the correction reference signal (for example, the first correction reference signal or the second correction reference signal) may be determined by using a subcarrier number or a resource block number. That is, for example, the joint channel correction instruction may carry the subcarrier number or the resource block number to indicate the frequency resource for receiving or transmitting the correction reference signal.

It may be understood that, if the joint channel correction instructions are used to express the time resources for receiving and transmitting the correction reference signals, this helps improve time coordination in signal dual-reception and dual-transmission, and helps prevent receivers from also receiving signals on invalid time resources.

It may be understood that, if the joint channel correction instructions are used to express the frequency resources for receiving and transmitting the correction reference signals, this helps improve frequency resource coordination in signal dual-reception and dual-transmission, and helps prevent the receivers from also receiving signals on invalid frequency resources.

The first correction reference signal mentioned in each embodiment of this application may be a known reference signal sequence or a reference signal sequence obtained based on a preset rule. The second correction reference signal mentioned in each embodiment of this application may be a known reference signal sequence or a reference signal sequence obtained based on a preset rule. The first correction reference signal and the second correction reference signal may be the same or different.

Optionally, in some possible implementations of the present application, the first RRU and the second RRU are RRUs serving the same UE. That is, channel correction may be performed between the RRUs serving the same UE, and channel correction may not be performed between RRUs serving different UEs, that is, independent channel correction may be performed between RRUs serving different UEs. Specifically, for example, the RRUs serving the same UE may be grouped into one RRU cluster, and channel correction is performed between RRUs in an RRU cluster, but independent channel correction is performed in different RRU clusters. Certainly, a manner of grouping RRUs into a cluster may also not be limited to a UE granularity. RRUs may also be grouped into a cluster by referring to other parameters. For example, several RRUs in adjacent positions may be grouped into one RRU cluster, or RRUs that are in adjacent positions and in which signal-to-noise ratios of signals exchanged with a reference RRU (for example, a zeroth RRU) are greater than a threshold may be grouped into one RRU cluster. However, no matter which mechanism is used for grouping RRUs into a cluster, channel correction is performed between RRUs in an RRU cluster, but independent channel correction is performed between different RRU clusters.

It may be understood that, if correction is performed between RRUs in a same RRU cluster, that is, a quantity of RRUs mutually corrected is appropriately limited, this helps reduce correction complexity to some extent.

As can be seen, in the solution of this embodiment, a joint channel correction apparatus sends a first joint channel correction instruction to a first RRU, triggering the first RRU to send a first correction reference signal through X1 transmit channels in X1 traffic channels of the first RRU, and sends a second joint channel correction instruction to a second RRU, triggering the second RRU to send a second correction reference signal through X2 transmit channels in X2 traffic channels of the second RRU. Because the joint channel correction apparatus receives and transmits the correction reference signals by using the traffic channels of the first RRU and the second RRU, and obtains correction compensation coefficients of the traffic channels of the first RRU and/or the traffic channels of the second RRU through calculation based on the correction reference signals received and transmitted by the first RRU and the second RRU through the traffic channels, by using the multi-RRU joint channel correction mechanism, even if the first RRU and the second RRU have no channel correction reference channel (that is, have no channel self-correction function), channel correction between the first RRU and the second RRU can also be implemented.

Further, for an indoor base station scenario, the technical solution of this embodiment may resolve a joint channel correction problem of indoor RRUs, and by means of joint channel correction, may increase a dimension of joint transmit antennas, increase a quantity of multiplexing users, improve spectrum efficiency, and the like.

The following illustrates some specific product forms.

Figure 3:
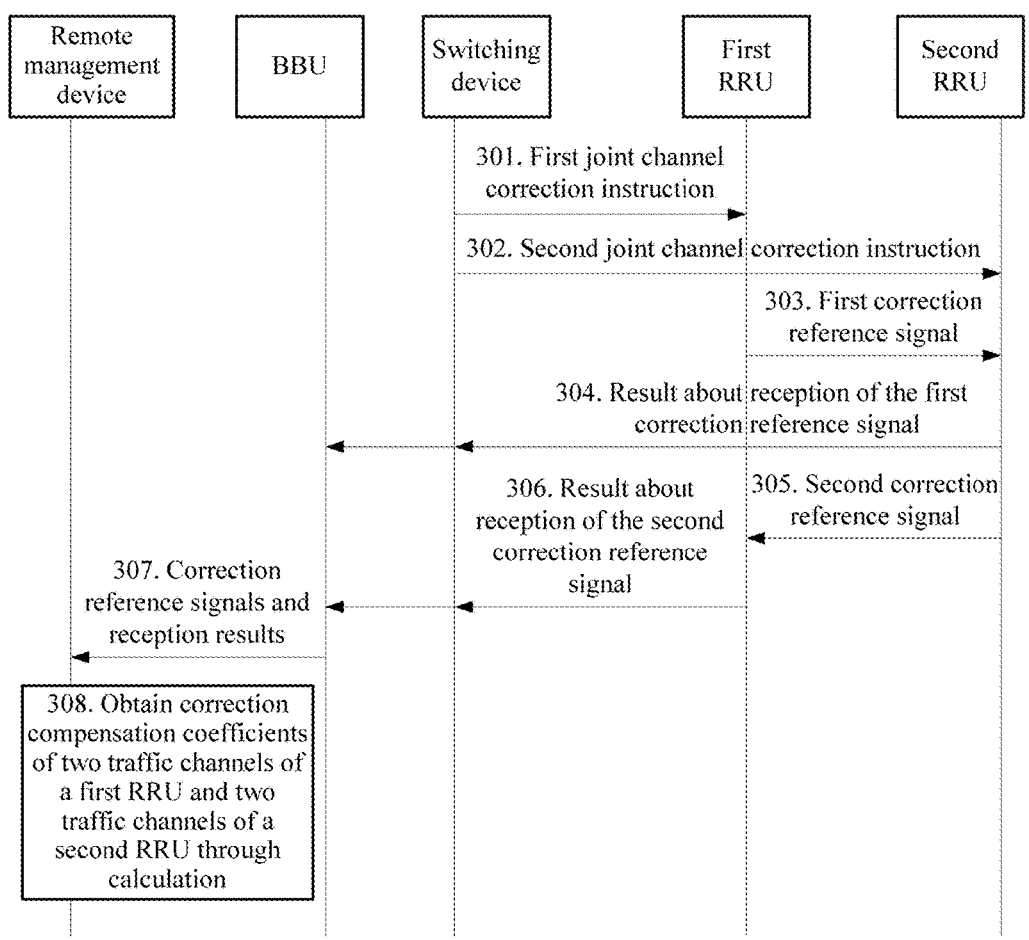
FIG. 3 is a schematic flowchart of another joint channel correction method according to an embodiment of the present application.

Referring to FIG. 3, FIG. 3 is a schematic flowchart of a joint channel correction method according to another embodiment of the present application. The joint channel correction method shown in FIG. 3 may be specifically implemented in a base station with an architecture illustrated in FIG. 1-*a*. This embodiment is mainly based on an example in which both X1 and X2 are equal to 2. Cases in which X1 and X2 are equal to other values may be derived by analogy. As illustrated in FIG. 3, a joint channel correction method provided by another embodiment of the present application may include the following steps.

301. A switching device (such as an rHub) sends a first joint channel correction instruction to a first RRU.

The first joint channel correction instruction is used to trigger the first RRU to send a first correction reference signal through two transmit channels in two traffic channels of the first RRU. The first RRU is an RRU that has no self-correction function.

Correspondingly, the first RRU receives the first joint channel correction instruction.

The first joint channel correction instruction may carry the first correction reference signal.

Further, the first joint channel correction instruction may carry an identity of the first RRU (the identity of the first RRU, for example, may include a cell number). That is, for example, the first RRU may be identified by the corresponding cell number and RRU number. In addition, the first joint channel correction instruction may further carry numbers of antennas corresponding to the two traffic channels of the first RRU. That is, the numbers of the antennas corresponding to the two traffic channels of the first RRU may be carried in the first joint channel correction instruction to indicate that the two traffic channels of the first RRU receive or transmit the correction reference signal.

Optionally, the first joint channel correction instruction further indicates a time resource and/or a frequency resource for sending the first correction reference signal on the two transmit channels in the two traffic channels of the first RRU.

In addition, the first correction reference signal may not be carried in the first joint channel correction instruction, but may be sent independently of the first joint channel correction instruction to the first RRU.

302. The switching device sends a second joint channel correction instruction to a second RRU.

The second joint channel correction instruction is used to trigger the second RRU to send a second correction reference signal through two transmit channels in two traffic channels of the second RRU. The second RRU is an RRU that has no self-correction function.

Correspondingly, the second RRU receives the second joint channel correction instruction.

The second joint channel correction instruction may carry the second correction reference signal.

In addition, the second correction reference signal may not be carried in the second joint channel correction instruction, but may be sent independently of the second joint channel correction instruction to the second RRU.

Further, the second joint channel correction instruction may carry an identity of the second RRU (the identity of the second RRU, for example, may include a second RRU number and a cell number). That is, for example, the second RRU may be identified by the corresponding cell number and RRU number. In addition, the second joint channel correction instruction may further carry numbers of antennas corresponding to the two traffic channels of the second RRU. That is, the numbers of the antennas corresponding to the two traffic channels of the second RRU may be carried in the second joint channel correction instruction to indicate that the two traffic channels of the second RRU receive or transmit the correction reference signal.

Optionally, the second joint channel correction instruction further indicates a time resource and/or a frequency resource for sending the second correction reference signal on the two transmit channels in the two traffic channels of the second RRU. The second joint channel correction instruction further indicates a time resource and/or a frequency resource for receiving the first correction reference signal on two receive channels in the two traffic channels of the second RRU. The first joint channel correction instruction further indicates a time resource and/or a frequency resource for receiving the second correction reference signal on two receive channels in the two traffic channels of the first RRU.

It may be understood that, the time resource and/or the frequency resource indicated by the first joint channel correction instruction and used for receiving the second correction reference signal on the two receive channels in the two traffic channels of the first RRU are/is the same as the time resource and/or the frequency resource indicated by the second joint channel correction instruction and used for sending the second correction reference signal on the two transmit channels in the two traffic channels of the second RRU. Likewise, the time resource and/or the frequency resource indicated by the first joint channel correction instruction and used for sending the first correction reference signal on the two transmit channels in the two traffic channels of the first RRU are/is the same as the time resource and/or the frequency resource indicated by the second joint channel correction instruction and used for receiving the first correction reference signal on the two receive channels in the two traffic channels of the second RRU.

For another example, the time resource indicated by the second joint channel correction instruction and used for sending the second correction reference signal on the two transmit channels in the two traffic channels of the second RRU, may have an intersection with the time resource indicated by the first joint channel correction instruction and used for receiving the second correction reference signal on two receive channels in the two traffic channels of the first RRU. For another example, the time resource indicated by the second joint channel correction instruction and used for receiving the first correction reference signal on the two receive channels in the two traffic channels of the second RRU, for example, may have an intersection with the time resource indicated by the first joint channel correction instruction and used for sending the first correction reference signal on the two transmit channels in the two traffic channels of the first RRU.

303. As instructed by the first joint channel correction instruction, the first RRU sends a first correction reference signal through two transmit channels in two traffic channels of the first RRU.

304. The second RRU sends, to the switching device, a result about reception of the first correction reference signal through two receive channels of the second RRU. The switching device forwards, to a BBU, the result about reception of the first correction reference signal through the two receive channels of the second RRU.

305. As instructed by the second joint channel correction instruction, the second RRU sends a second correction reference signal through two transmit channels in two traffic channels of the second RRU.

306. The first RRU sends, to the switching device, a result about reception of the second correction reference signal through two receive channels of the first RRU. The switching device forwards, to the BBU, the result about reception of the second correction reference signal through the two receive channels of the first RRU.

307. The BBU forwards the second correction reference signal and the result about reception of the second correction reference signal through the two receive channels of the first RRU to a remote management device. The BBU forwards the first correction reference signal and the result about reception of the first correction reference signal through the two receive channels of the second RRU to the remote management device.

308. The remote management device obtains correction compensation coefficients of the two traffic channels of the first RRU and the two traffic channels of the second RRU through calculation according to the first correction reference signal, the result about reception of the first correction reference signal through the two receive channels of the second RRU, the second correction reference signal, and the result about reception of the second correction reference signal through the two receive channels of the first RRU.

The remote management device may feed back the correction compensation coefficients, obtained through calculation, of the two traffic channels of the first RRU and the two traffic channels of the second RRU to the BBU. The BBU may feed back the correction compensation coefficients of the two traffic channels of the first RRU to the first RRU, and the BBU may feed back the correction compensation coefficients of the two traffic channels of the second RRU to the second RRU.

The correction compensation coefficients are used to compensate for inconsistency of channel responses between the receive channels and the transmit channels in the traffic channels.

For example, the correction compensation coefficients of the two traffic channels of the first RRU may be used to perform phase compensation and/or amplitude compensation for signals received or transmitted by the two traffic channels of the first RRU. The correction compensation coefficients of the two traffic channels of the second RRU may be used to perform phase compensation and/or amplitude compensation for signals received or transmitted by the two traffic channels of the second RRU.

Optionally, in some possible implementations of the present application, the first correction reference signal sent by the two transmit channels in the two traffic channels of the first RRU may be distinguished in a manner of frequency division, code division, time division, or the like.

Optionally, in some possible implementations of the present application, the second correction reference signal sent by the two transmit channels in the two traffic channels of the second RRU may be distinguished in a manner of frequency division, code division, time division, or the like.

The remote management device may obtain, by referring to the manner illustrated in the foregoing embodiment, the correction compensation coefficients of the two traffic channels of the first RRU and the two traffic channels of the second RRU through calculation according to the result about reception of the first correction reference signal through the two receive channels of the second RRU, the first correction reference signal, the second correction reference signal, and the result about reception of the second correction reference signal through the two receive channels of the first RRU.

It may be understood that, this embodiment is mainly based on an example in which joint channel correction is performed between the two RRUs, namely, the first RRU and the second RRU. Scenarios with more RRUs may be derived by analogy. For example, if abase station further includes an $RRU_2$, joint channel correction may also be performed between the first RRU and the $RRU_2$ in a manner similar to the manner of performing joint channel correction between the first RRU and the second RRU.

Joint channel correction may be performed between the first RRU and multiple RRUs synchronously. Certainly, joint channel correction may also be performed between multiple RRUs in series. For a specific joint channel correction manner, refer to the foregoing example. Details are not described again herein.

As can be seen, in the solution of this embodiment, a switching device (rHub) of a base station sends a first joint channel correction instruction to a first RRU, triggering the first RRU to send a first correction reference signal through two transmit channels in two traffic channels of the first RRU; and the switching device sends a second joint channel correction instruction to a second RRU, triggering the second RRU to send a second correction reference signal through two transmit channels in two traffic channels of the second RRU. A remote management device obtains correction compensation coefficients of the two traffic channels of the first RRU and the two traffic channels of the second RRU through calculation according to the first correction reference signal, a result about reception of the first correction reference signal through receive channels of the second RRU, the second correction reference signal, and a result about reception of the second correction reference signal through receive channels of the first RRU. Because the correction reference signals are received and transmitted by using the traffic channels of the first RRU and the second RRU, and the correction compensation coefficients of the two traffic channels of the first RRU and the two traffic channels of the second RRU are obtained through calculation based on the correction reference signals received and transmitted by the first RRU and the second RRU through the traffic channels, by using the multi-RRU joint channel correction mechanism, even if the first RRU and the second RRU have no channel correction reference channel (that is, have no channel self-correction function), channel correction between multiple RRUs can also be implemented.

Further, for an indoor base station scenario, the technical solution of this embodiment may resolve a joint channel correction problem of indoor RRUs, and by means of joint channel correction, may increase a dimension of joint transmit antennas, increase a quantity of multiplexing users, improve spectrum efficiency, and the like. The switching device or the like assists in controlling joint channel correction. Therefore, no other correction assisting units need to be added, and feasibility is high. This may help implement joint channel correction between RRUs having no self-correction function, and may save channel self-correction costs and space required by channel self-correction, help further reduce a product size, and enhance product competitiveness.

It may be understood that, this embodiment is described by using an example in which the remote management device calculates the correction compensation coefficients. Certainly, the BBU may also directly calculate the correction compensation coefficients. If the BBU calculates the correction compensation coefficients, the remote management device is not required any longer, and steps related to information exchange with the remote management device are also not required.

It may be understood that, this embodiment is described by using an example in which both X1 and X2 are equal to 2. Certainly, cases in which X1 and X2 are equal to other values may be derived by analogy.

Figure 4:
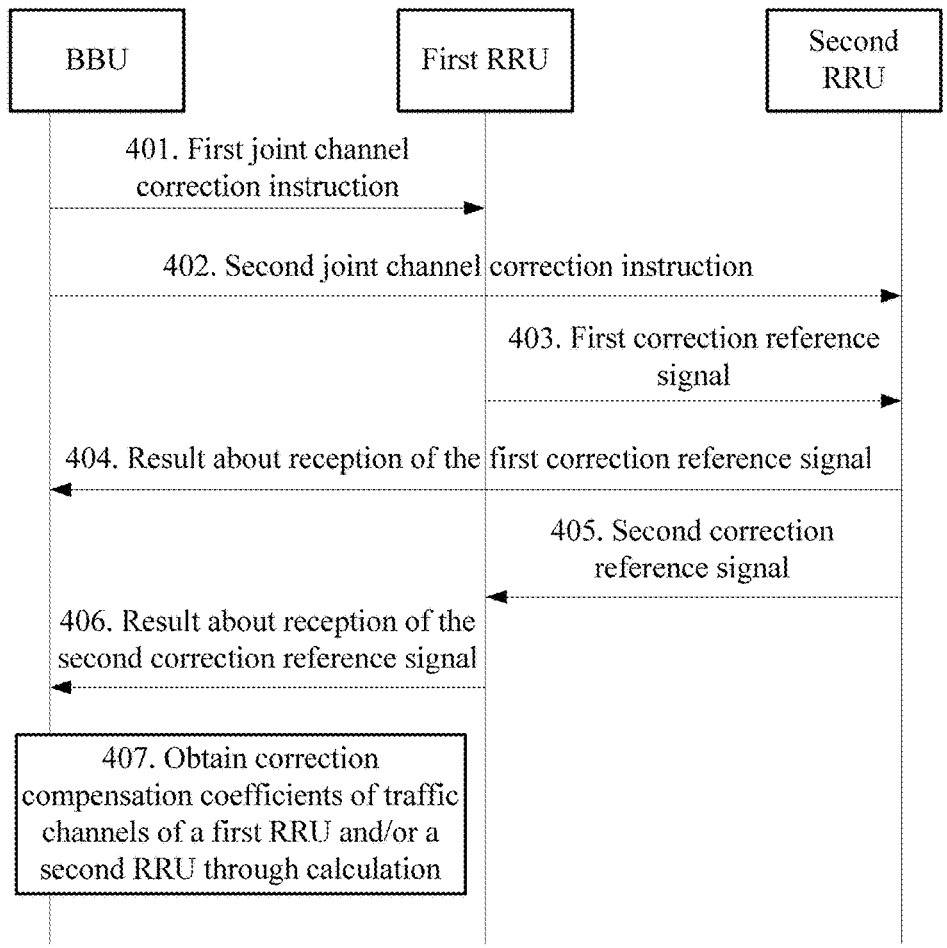
FIG. 4 is a schematic flowchart of another joint channel correction method according to an embodiment of the present application.

Referring to FIG. 4, FIG. 4 is a schematic flowchart of a joint channel correction method according to another embodiment of the present application. The joint channel correction method shown in FIG. 4 may be specifically implemented in a base station with an architecture illustrated FIG. 1-*c*. This embodiment is mainly based on an example in which both X1 and X2 are equal to 2. Cases in which X1 and X2 are equal to other values may be derived by analogy. As illustrated in FIG. 4-*b*, a joint channel correction method provided by an embodiment of the present application may include the following steps.

401. A BBU sends a first joint channel correction instruction to a first RRU.

The first joint channel correction instruction is used to trigger the first RRU to send a first correction reference signal through two transmit channels in two traffic channels of the first RRU. The first RRU is an RRU that has no self-correction function.

Correspondingly, the first RRU receives the first joint channel correction instruction.

The first joint channel correction instruction may carry the first correction reference signal.

In addition, the first correction reference signal may not be carried in the first joint channel correction instruction, but may be sent independently of the first joint channel correction instruction to the first RRU.

Further, the first joint channel correction instruction may carry an identity of the first RRU (the identity of the first RRU, for example, may include a cell number). That is, for example, the first RRU may be identified by the corresponding cell number and RRU number. In addition, the first joint channel correction instruction may further carry numbers of antennas corresponding to the two traffic channels of the first RRU. That is, the numbers of the antennas corresponding to the two traffic channels of the first RRU may be carried in the first joint channel correction instruction to indicate that the two traffic channels of the first RRU receive or transmit the correction reference signal.

Optionally, the first joint channel correction instruction further indicates a time resource and/or a frequency resource for sending the first correction reference signal on the two transmit channels in the two traffic channels of the first RRU.

402. The BBU sends a second joint channel correction instruction to a second RRU.

The second joint channel correction instruction is used to trigger the second RRU to send a second correction reference signal through two transmit channels in two traffic channels of the second RRU. The second RRU is an RRU that has no self-correction function.

Correspondingly, the second RRU receives the second joint channel correction instruction.

The second joint channel correction instruction may carry the second correction reference signal.

In addition, the second correction reference signal may not be carried in the second joint channel correction instruction, but may be sent independently of the second joint channel correction instruction to the second RRU.

Further, the second joint channel correction instruction may carry an identity of the second RRU (the identity of the second RRU, for example, may include a second RRU number and a cell number). That is, for example, the second RRU may be identified by the corresponding cell number and RRU number. In addition, the first joint channel correction instruction may further carry numbers of antennas corresponding to the two traffic channels of the first RRU. That is, the numbers of the antennas corresponding to the two traffic channels of the second RRU may be carried in the second joint channel correction instruction to indicate that the two traffic channels of the second RRU receive or transmit the correction reference signal.

Optionally, the second joint channel correction instruction further indicates a time resource and/or a frequency resource for sending the second correction reference signal on the two transmit channels in the two traffic channels of the second RRU. The second joint channel correction instruction further indicates a time resource and/or a frequency resource for receiving the first correction reference signal on two receive channels in the two traffic channels of the second RRU. The first joint channel correction instruction further indicates a time resource and/or a frequency resource for receiving the second correction reference signal on two receive channels in the two traffic channels of the first RRU.

It may be understood that, the time resource and/or the frequency resource indicated by the first joint channel correction instruction and used for receiving the second correction reference signal on the two receive channels in the two traffic channels of the first RRU are/is the same as the time resource and/or the frequency resource indicated by the second joint channel correction instruction and used for sending the second correction reference signal on the two transmit channels in the two traffic channels of the second RRU. Likewise, the time resource and/or the frequency resource indicated by the first joint channel correction instruction and used for sending the first correction reference signal on the two transmit channels in the two traffic channels of the first RRU are/is the same as the time resource and/or the frequency resource indicated by the second joint channel correction instruction and used for receiving the first correction reference signal on the two receive channels in the two traffic channels of the second RRU.

For another example, the time resource indicated by the second joint channel correction instruction and used for sending the second correction reference signal on the two transmit channels in the two traffic channels of the second RRU, may have an intersection with the time resource indicated by the first joint channel correction instruction and used for receiving the second correction reference signal on two receive channels in the two traffic channels of the first RRU. For another example, the time resource indicated by the second joint channel correction instruction and used for receiving the first correction reference signal on the two receive channels in the two traffic channels of the second RRU, for example, may have an intersection with the time resource indicated by the first joint channel correction instruction and used for sending the first correction reference signal on the two transmit channels in the two traffic channels of the first RRU.

403. As instructed by the first joint channel correction instruction, the first RRU sends a first correction reference signal through two transmit channels in two traffic channels of the first RRU.

404. The second RRU sends, to the BBU, a result about reception of the first correction reference signal through two receive channels of the second RRU.

405. As instructed by the second joint channel correction instruction, the second RRU sends a second correction reference signal through two transmit channels in two traffic channels of the second RRU.

406. The first RRU sends, to the BBU, a result about reception of the second correction reference signal through two receive channels of the first RRU.

407. The BBU obtains correction compensation coefficients of the two traffic channels of the first RRU and the two traffic channels of the second RRU through calculation according to the first correction reference signal, the result about reception of the first correction reference signal through the two receive channels of the second RRU, the second correction reference signal, and the result about reception of the second correction reference signal through the two receive channels of the first RRU.

The BBU may store the correction compensation coefficients, obtained through calculation, of the two traffic channels of the first RRU and the two traffic channels of the second RRU. The BBU may further feed back the correction compensation coefficients of the two traffic channels of the first RRU to the first RRU, and the BBU may feed back the correction compensation coefficients of the two traffic channels of the second RRU to the second RRU.

The correction compensation coefficients of the two traffic channels of the first RRU may be used to perform phase compensation and/or amplitude compensation for signals received or transmitted by the two traffic channels of the first RRU. The correction compensation coefficients of the two traffic channels of the second RRU may be used to perform phase compensation and/or amplitude compensation for signals received or transmitted by the two traffic channels of the second RRU.

It may be understood that, this embodiment is mainly based on an example in which joint channel correction is performed between the two RRUs, namely, the first RRU and the second RRU. Scenarios with more RRUs may be derived by analogy. For example, if a base station further includes an $RRU_2$, joint channel correction may also be performed between the first RRU and the $RRU_2$ in a manner similar to the manner of performing joint channel correction between the first RRU and the second RRU.

Joint channel correction may be performed between the first RRU and multiple RRUs synchronously. Certainly, joint channel correction may also be performed between multiple RRUs in series. For a specific joint channel correction manner, refer to the foregoing example. Details are not described again herein.

As can be seen, in the solution of this embodiment, a BBU of a base station sends a first joint channel correction instruction to a first RRU, triggering the first RRU to send a first correction reference signal through two transmit channels in two traffic channels of the first RRU; and the BBU sends a second joint channel correction instruction to a second RRU, triggering the second RRU to send a second correction reference signal through two transmit channels in two traffic channels of the second RRU. The BBU obtains correction compensation coefficients of the two traffic channels of the first RRU and the two traffic channels of the second RRU through calculation according to the first correction reference signal, a result about reception of the first correction reference signal through receive channels of the second RRU, the second correction reference signal, and a result about reception of the second correction reference signal through receive channels of the first RRU. Because the correction reference signals are received and transmitted by using the traffic channels of the first RRU and the second RRU, and the correction compensation coefficients of the two traffic channels of the first RRU and the two traffic channels of the second RRU are obtained through calculation based on the correction reference signals received and transmitted by the first RRU and the second RRU through the traffic channels, by using the multi-RRU joint channel correction mechanism, even if the first RRU and the second RRU have no channel correction reference channel (that is, have no channel self-correction function) channel correction between multiple RRUs can also be implemented.

Further, for an indoor base station scenario, the technical solution of this embodiment may resolve a joint channel correction problem of indoor RRUs, and by means of joint channel correction, may increase a dimension of joint transmit antennas, increase a quantity of multiplexing users, improve spectrum efficiency, and the like. The BBU or the like assists in controlling joint channel correction. Therefore, no other correction assisting units need to be added, and feasibility is high. This may help implement joint channel correction between RRUs having no self-correction function, and may save channel self-correction costs and space required by channel self-correction, help further reduce a product size, and enhance product competitiveness.

It may be understood that, this embodiment is described by using an example in which both X1 and X2 are equal to 2. Certainly, cases in which X1 and X2 are equal to other values may be derived by analogy.

The following illustrates a manner of calculating correction compensation coefficients.

Optionally, in some possible implementations of the present application, the obtaining correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels may include: obtaining channel response estimated values between the X1 transmit channels and the X2 receive channels through calculation according to the first correction reference signal and the result about reception of the first correction reference signal through the X2 receive channels; obtaining channel response estimated values between the X2 transmit channels and the X1 receive channels through calculation according to the second correction reference signal and the result about reception of the second correction reference signal through the X1 receive channels; and obtaining the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels.

Optionally, in some possible implementations of the present application, the channel response estimated values may be expressed by using the following formula:

$$H_{RRU_iRx_k-RRU_jTx_m} = H_{RRU_iRx_k} H_{RRU_iRx_k-RRU_jTx_m}^{Air} H_{RRU_jTx_m}, \text{ where}$$

$H_{RRU_iRx_k-RRU_jTx_m}$ indicates a channel response estimated value between a receive channel in a $k^{th}$ traffic channel of an $i^{th}$ RRU and a transmit channel in an $m^{th}$ traffic channel of a $j^{th}$ RRU;

$H_{RRU_iRx_k-RRU_jTx_m}^{Air}$ indicates a channel response estimated value on an air interface between the receive channel in the $k^{th}$ traffic channel of the $i^{th}$ RRU and the transmit channel in the $m^{th}$ traffic channel of the $j^{th}$ RRU; and $H_{RRU_iRx_k}$ indicates a channel response estimated value of the receive channel in the $k^{th}$ traffic channel of the $i^{th}$ RRU, and $H_{RRU_jTx_m}$ indicates a channel response estimated value of the transmit channel in the $m^{th}$ traffic channel of the $j^{th}$ RRU.

To simplify the expression, assuming that $\mu_a$ indicates a ratio of a channel response estimated value of a receive channel in an $a^{th}$ traffic channel to that of a transmit channel in the $a^{th}$ traffic channel, $\alpha_{ab}$ may be defined as a ratio of a $\mu$ value of the $a^{th}$ traffic channel to a $\mu$ value of a $b^{th}$ traffic channel, that is, $\alpha_{ab} = \mu_a/\mu_b$.

Optionally, in some possible implementations of the present application, the obtaining the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels may include: obtaining the correction compensation coefficients of the X2 traffic channels through calculation according to the channel response estimated values between the X1 transmit channels and the X2 receive channels and the channel response estimated values between the X2 transmit channels and the X1 receive channels by using the following formula:

$$\alpha_{RRU_ik-RRU_jm} =$$

$$\frac{H_{RRU_iRx_k-RRU_jTx_m}}{H_{RRU_jRx_m-RRU_iTx_k}} = \frac{H_{RRU_iRx_k} H_{RRU_iRx_k-RRU_jTx_m}^{Air} H_{RRU_jTx_m}}{H_{RRU_jRx_m} H_{RRU_jRx_m-RRU_iTx_k}^{Air} H_{RRU_iTx_k}} =$$

-continued $$\frac{H_{RRU_iRx_k}H_{RRU_jTx_m}}{H_{RRU_jRx_m}H_{RRU_iTx_k}} = \frac{\frac{H_{RRU_iRx_k}}{H_{RRU_iTx_k}}}{\frac{H_{RRU_jRx_m}}{H_{RRU_jTx_m}}} = \frac{\mu_{RRU_{ik}}}{\mu_{RRU_{jm}}},$$

where $\alpha_{RRU_{jk}\text{-}RRU_{jm}}$ indicates a correction compensation coefficient between a $k^{th}$ traffic channel of an $i^{th}$ RRU and an $m^{th}$ traffic channel of a $j^{th}$ RRU; and $\mu_{RRU_{ik}}$ indicates a ratio of a channel response estimated value of a receive channel to that of a transmit channel in the $k^{th}$ traffic channel of the $i^{th}$ RRU, and $\mu_{RRU_{jm}}$ indicates a ratio of a channel response estimated value of a receive channel to that of a transmit channel in the $m^{th}$ traffic channel of the $j^{th}$ RRU.

In the foregoing example, it is assumed that a same frequency is used for downlink transmission and uplink reception, and that air interface channels have reciprocity. Therefore, $H_{RRU_iRx_k\text{-}RRU_jTx_m}^{Air}=H_{RRU_jRx_m\text{-}RRU_iTx_k}^{Air}$. A calculation process is simplified by using the reciprocity of the air interface channels.

Optionally, in some possible implementations of the present application, the obtaining the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels further includes: obtaining the correction compensation coefficients of the X1 traffic channels by using the following formula:

$$\alpha_{RRU_{ik}\text{-}RRU_{in}} = \frac{\frac{H_{RRU_iRx_k\text{-}RRU_jTx_m}}{H_{RRU_jRx_m\text{-}RRU_iTx_k}}}{\frac{H_{RRU_iRx_n\text{-}RRU_jTx_m}}{H_{RRU_jRx_m\text{-}RRU_iTx_n}}} = \frac{\alpha_{RRU_{ik}\text{-}RRU_{jm}}}{\alpha_{RRU_{in}\text{-}RRU_{jm}}} = \frac{\mu_{RRU_{ik}}}{\mu_{RRU_{in}}},$$

where $\alpha_{RRU_{ik}\text{-}RRU_{in}}$ indicates a correction compensation coefficient between a $k^{th}$ traffic channel of an $i^{th}$ RRU and an $n^{th}$ traffic channel of the $i^{th}$ RRU; and $\mu_{RRU_{in}}$ indicates a ratio of a channel response estimated value of a receive channel to that of a transmit channel in the $n^{th}$ traffic channel of the $i^{th}$ RRU.

Optionally, in some possible implementations of the present application, a compensation method may include: performing phase compensation and/or amplitude compensation for a to-be-transmitted uplink signal of a $k^{th}$ traffic channel by using $\alpha_{0k}$ ($\alpha_{0k}$ indicates a correction compensation coefficient between the $k^{th}$ traffic channel and a zeroth traffic channel, that is, it indicates a correction compensation coefficient of the $k^{th}$ traffic channel relative to the zeroth traffic channel). Alternatively, $a_{0k}$ may be used to perform compensation for a downlink signal of the $k^{th}$ traffic channel.

The foregoing example provides a general description about calculation of the correction compensation coefficient. The following describes a manner of calculating correction compensation coefficients for an $RRU_0$ and an $RRU_1$ by using an example in which both X1 and X2 are equal to 2.

Optionally, in some possible implementations of the present application, channel response estimated values between two transmit channels of the $RRU_0$ and two receive channels of the $RRU_1$, obtained through calculation, may be expressed as follows:

$$H_{RRU_1Rx_0\text{-}RRU_0Tx_0} = H_{RRU_1Rx_0}H_{RRU_1Rx_0\text{-}RRU_0Tx_0}^{Air}H_{RRU_0Tx_0}$$

$$H_{RRU_1Rx_1\text{-}RRU_0Tx_0} = H_{RRU_1Rx_1}H_{RRU_1Rx_1\text{-}RRU_0Tx_0}^{Air}H_{RRU_0Tx_0}$$

$$H_{RRU_1Rx_0\text{-}RRU_0Tx_1} = H_{RRU_1Rx_0}H_{RRU_1Rx_0\text{-}RRU_0Tx_1}^{Air}H_{RRU_0Tx_1}$$

$$H_{RRU_1Rx_1\text{-}RRU_0Tx_1} = H_{RRU_1Rx_1}H_{RRU_1Rx_1\text{-}RRU_0Tx_1}^{Air}H_{RRU_0Tx_1},$$ where $H_{RRU_1Rx_0\text{-}RRU_0Tx_0}$ indicates a channel response estimated value between a receive channel in a zeroth traffic channel of the $RRU_1$ and a transmit channel in a zeroth traffic channel of the $RRU_0$; $H_{RRU_1Rx_0\text{-}RRU_0Tx_0}^{Air}$ indicates a channel response estimated value on an air interface between the receive channel in the zeroth traffic channel of the $RRU_1$ and the transmit channel in the zeroth traffic channel of the $RRU_0$; and $H_{RRU_1Rx_0}$ indicates a channel response estimated value of the receive channel in the zeroth traffic channel of the $RRU_1$, and $H_{RRU_0Tx_0}$ indicates a channel response estimated value of the transmit channel in the zeroth traffic channel of the $RRU_0$, and so on.

Optionally, in some possible implementations of the present application, channel response estimated values between two transmit channels of the $RRU_1$ and two receive channels of the $RRU_0$, obtained through calculation, may be expressed as follows:

$$H_{RRU_0Rx_0\text{-}RRU_1Tx_0} = H_{RRU_0Rx_0}H_{RRU_0Rx_0\text{-}RRU_1Tx_0}^{Air}H_{RRU_1Tx_0}$$

$$H_{RRU_0Rx_1\text{-}RRU_1Tx_0} = H_{RRU_0Rx_1}H_{RRU_0Rx_1\text{-}RRU_1Tx_0}^{Air}H_{RRU_1Tx_0}$$

$$H_{RRU_0Rx_0\text{-}RRU_1Tx_1} = H_{RRU_0Rx_0}H_{RRU_0Rx_0\text{-}RRU_1Tx_1}^{Air}H_{RRU_1Tx_1}$$

$$H_{RRU_0Rx_1\text{-}RRU_1Tx_1} = H_{RRU_0Rx_1}H_{RRU_0Rx_1\text{-}RRU_1Tx_1}^{Air}H_{RRU_1Tx_1}.$$

A general expression form of the foregoing formulas may be as follows:

$$H_{RRU_iRx_k\text{-}RRU_jTx_m} = H_{RRU_iRx_k}H_{RRU_iRx_k\text{-}RRU_jTx_m}^{Air}H_{RRU_jTx_m},$$ where $H_{RRU_iRx_k\text{-}RRU_jTx_m}$ indicates a channel response estimated value between a receive channel in a $k^{th}$ traffic channel of an $i^{th}$ RRU and a transmit channel in an $m^{th}$ traffic channel of a $j^{th}$ RRU;

$H_{RRU_iRx_k\text{-}RRU_jTx_m}^{Air}$ indicates a channel response estimated value on an air interface between the receive channel in the $k^{th}$ traffic channel of the $i^{th}$ RRU and the transmit channel in the $m^{th}$ traffic channel of the $j^{th}$ RRU; and $H_{RRU_iRx_k}$ indicates a channel response estimated value of the receive channel in the $k^{th}$ traffic channel of the $i^{th}$ RRU, and $H_{RRU_jTx_m}$ indicates a channel response estimated value of the transmit channel in the $m^{th}$ traffic channel of the $j^{th}$ RRU.

To simplify the expression, assuming that $\mu_a$ indicates a ratio of a channel response estimated value of a receive channel in an $a^{th}$ traffic channel to that of a transmit channel in the $a^{th}$ traffic channel, $\alpha_{ab}$ may be defined as a ratio of a 9 value of the $a^{th}$ traffic channel to a $\mu$ value of a $b^{th}$ traffic channel, that is, $\alpha_{ab}=\mu_a/\mu_b$.

Optionally, in some possible implementations of the present application, obtaining correction compensation coefficients of two traffic channels of the $RRU_0$ and two traffic channels of the $RRU_1$ through calculation according to the channel response estimated values between the two transmit channels of the $RRU_1$ and the two receive channels of the $RRU_0$ and the channel response estimated values between the two transmit channels of the $RRU_0$ and the two receive channels of the $RRU_1$ may include: obtaining the correction compensation coefficients of the two traffic channels of the $RRU_0$ and the two traffic channels of the $RRU_1$ through calculation according to the channel response estimated values between the two transmit channels of the $RRU_1$ and the two receive channels of the $RRU_0$ and the channel response estimated values between the two transmit channels of the $RRU_0$ and the two receive channels of the $RRU_1$:

$$\alpha_{RRU_i0-RRU_00} =$$

$$\frac{H_{RRU_1Rx_0-RRU_0Tx_0}}{H_{RRU_0Rx_0-RRU_1Tx_0}} = \frac{H_{RRU_1Rx_0}H_{RRU_1Rx_0-RRU_0Tx_0}^{Air}H_{RRU_0Tx_0}}{H_{RRU_0Rx_0}H_{RRU_0Rx_0-RRU_1Tx_0}^{Air}H_{RRU_1Tx_0}} =$$

$$\frac{H_{RRU_1Rx_0}H_{RRU_0Tx_0}}{H_{RRU_0Rx_0}H_{RRU_1Tx_0}} = \frac{\mu_{RRU_10}}{\mu_{RRU_00}},$$

where $\alpha_{RRU_10-RRU_00}$ indicates a correction compensation coefficient between a zeroth traffic channel of the RRU1 and a zeroth traffic channel of the $\mu_{RRU_00}$ indicates a ratio of a channel response estimated value of a receive channel to that of a transmit channel in the zeroth traffic channel of the $\mu_{RRU_00}$ and indicates a ratio of a channel response estimated value of a receive channel to that of a transmit channel in the zeroth traffic channel of the $RRU_1$. Other cases may be derived by analogy.

Optionally, in some possible implementations of the present application, $$\alpha_{RRU_01-RRU_00} = \frac{\alpha_{RRU_10-RRU_00}}{\alpha_{RRU_11-RRU_00}} = \frac{\mu_{RRU_01}}{\mu_{RRU_00}},$$

where $\alpha_{RRU_01-RRU_00}$ indicates a correction compensation coefficient between a first traffic channel of the $RRU_0$ and a zeroth traffic channel of the $RRU_0$; $\mu_{RRU_01}$ indicates a ratio of a channel response estimated value of a receive channel to that of a transmit channel in the first traffic channel of the $RRU_0$;

$\alpha_{RRU_11-RRU_00}$ indicates a correction compensation coefficient between a first traffic channel of the $RRU_1$ and the zeroth traffic channel of the $RRU_0$, and may be used to indicate a reciprocity difference between the first traffic channel of the $RRU_1$ and the zeroth traffic channel of the $RRU_0$; and $\alpha_{RRU_01-RRU_00}$ may be used to indicate a reciprocity difference between the first traffic channel of the $RRU_0$ and the zeroth traffic channel of the $RRU_0$.

By using the manner in the foregoing example, a relationship between $\mu_{RRU_00}$ and a μ value of another traffic channel may be found. $\alpha_{RRU_00-RRU_00}$ may be set to 1. By means of compensation, reciprocity of all other traffic channels can be aligned with the zeroth traffic channel of the $RRU_0$. After traffic channel compensation is completed, uplink/downlink reciprocity of multiple RRUs in a TDD system can be ensured to some extent. In this way, uplink channel estimation information of multiple RRUs may be used to complete weight calculation for downlink joint transmission. This may increase a dimension of joint transmit antennas, increase a quantity of multiplexing users, improve spectrum efficiency, and the like.

The following further provides a related device and a communications system that may perform the joint channel correction method in the foregoing embodiment of the present application. Entities in the communications system or the related device may cooperate in performing the joint channel correction method provided by the embodiment of the present application.

Figure 5:
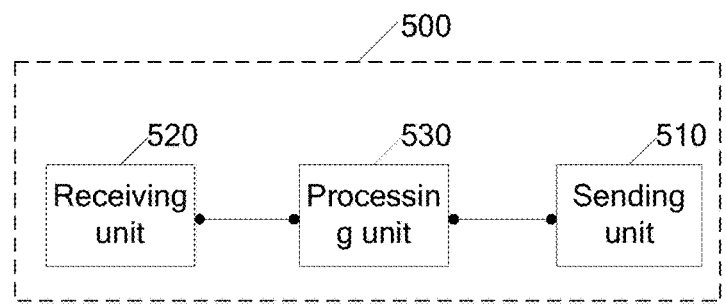
FIG. 5 is a schematic diagram of a joint channel correction apparatus according to an embodiment of the present application.

Referring to FIG. 5, an embodiment of the present application further provides a multi-RRU joint channel correction apparatus 500. The apparatus may include:

a sending unit 510, configured to send a first joint channel correction instruction to a first RRU, where the first joint channel correction instruction is used to trigger the first RRU to send a first correction reference signal through X1 transmit channels in X1 traffic channels of the first RRU; where the sending unit 510 is further configured to send a second joint channel correction instruction to a second RRU, where the second joint channel correction instruction is used to trigger the second RRU to send a second correction reference signal through X2 transmit channels in X2 traffic channels of the second RRU;

a receiving unit 520, configured to receive a result sent by the second RRU about reception of the first correction reference signal through X2 receive channels in the X2 traffic channels, and receive a result sent by the first RRU about reception of the second correction reference signal through X1 receive channels in the X1 traffic channels; and a processing unit 530, configured to obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

Optionally, the first joint channel correction instruction further indicates a time resource and/or a frequency resource for sending the first correction reference signal on the X1 transmit channels in the X1 traffic channels of the first RRU, and the second joint channel correction instruction further indicates a time resource and/or a frequency resource for receiving the first correction reference signal on the X2 receive channels in the X2 traffic channels of the second RRU.

Optionally, the second joint channel correction instruction further indicates a time resource and/or a frequency resource for sending the second correction reference signal on the X2 transmit channels in the X2 traffic channels of the second RRU, and the first joint channel correction instruction further indicates a time resource and/or a frequency resource for receiving the second correction reference signal on the X1 receive channels in the X1 traffic channels of the first RRU.

Optionally, the first RRU and the second RRU are RRUs serving same UE.

Optionally, the processing unit 530 is specifically configured to: obtain channel response estimated values between the X1 transmit channels and the X2 receive channels through calculation according to the first correction reference signal and the result about reception of the first correction reference signal through the X2 receive channels; obtain channel response estimated values between the X2 transmit channels and the X1 receive channels through calculation according to the second correction reference signal and the result about reception of the second correction reference signal through the X1 receive channels; and obtain the correction compensation coefficients of the X1 traffic channels and/or the X2 traffic channels through calculation according to the channel response estimated values between the X1 transmit channels and the X2 receive channels and the channel response estimated values between the X2 transmit channels and the X1 receive channels.

For a manner in which the processing unit 530 obtains the correction compensation coefficients of the X1 traffic channels and/or the X2 traffic channels through calculation, refer to related descriptions in the foregoing embodiment. Details are not described again herein.

For example, the first RRU and the second RRU are RRUs serving the same UE.

Figure 6:
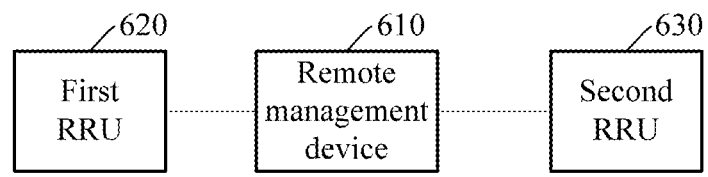
FIG. 6 is a schematic diagram of a communications system according to an embodiment of the present application.

Referring to FIG. 6, an embodiment of the present application further provides a communications system, including:

a remote management device 610, a first RRU 620, and a second RRU 630.

The remote management device 610 is configured to: send a first joint channel correction instruction to the first RRU, where the first joint channel correction instruction is used to trigger the first RRU to send a first correction reference signal through X1 transmit channels in X1 traffic channels of the first RRU; send a second joint channel correction instruction to the second RRU, where the second joint channel correction instruction is used to trigger the second RRU to send a second correction reference signal through X2 transmit channels in X2 traffic channels of the second RRU; receive a result sent by the second RRU about reception of the first correction reference signal through X2 receive channels in the X2 traffic channels, and receive a result sent by the first RRU about reception of the second correction reference signal through X1 receive channels in the X1 traffic channels; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

Optionally, the first joint channel correction instruction further indicates a time resource and/or a frequency resource for sending the first correction reference signal on the X1 transmit channels in the X1 traffic channels of the first RRU, and the second joint channel correction instruction further indicates a time resource and/or a frequency resource for receiving the first correction reference signal on the X2 receive channels in the X2 traffic channels of the second RRU.

Optionally, the second joint channel correction instruction further indicates a time resource and/or a frequency resource for sending the second correction reference signal on the X2 transmit channels in the X2 traffic channels of the second RRU, and the first joint channel correction instruction further indicates a time resource and/or a frequency resource for receiving the second correction reference signal on the X1 receive channels in the X1 traffic channels of the first RRU.

Optionally, the first RRU and the second RRU may be RRUs serving same UE. The first RRU and the second RRU may belong to or not belong to a same base station.

For a manner in which the remote management device 610 obtains the correction compensation coefficients of the X1 traffic channels and/or the X2 traffic channels through calculation, refer to related descriptions in the foregoing embodiment. Details are not described again herein.

Figure 7:
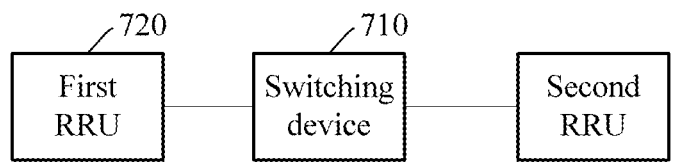
FIG. 7 is a schematic diagram of a base station according to an embodiment of the present application.

Referring to FIG. 7, an embodiment of the present application further provides a base station, including:

a switching device 710 and a first RRU 720.

The switching device 710 may be configured to: send a first joint channel correction instruction to the first RRU, where the first joint channel correction instruction is used to trigger the first RRU to send a first correction reference signal through X1 transmit channels in X1 traffic channels of the first RRU; send a second joint channel correction instruction to a second RRU, where the second joint channel correction instruction is used to trigger the second RRU to send a second correction reference signal through X2 transmit channels in X2 traffic channels of the second RRU; receive a result sent by the second RRU about reception of the first correction reference signal through X2 receive channels in the X2 traffic channels, and receive a result sent by the first RRU about reception of the second correction reference signal through X1 receive channels in the X1 traffic channels; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

Optionally, the first RRU and the second RRU may be RRUs serving same UE. The first RRU and the second RRU may belong to or not belong to a same base station.

For a manner in which the switching device 710 obtains the correction compensation coefficients of the X1 traffic channels and/or the X2 traffic channels through calculation, refer to related descriptions in the foregoing embodiment. Details are not described again herein.

Figure 8:
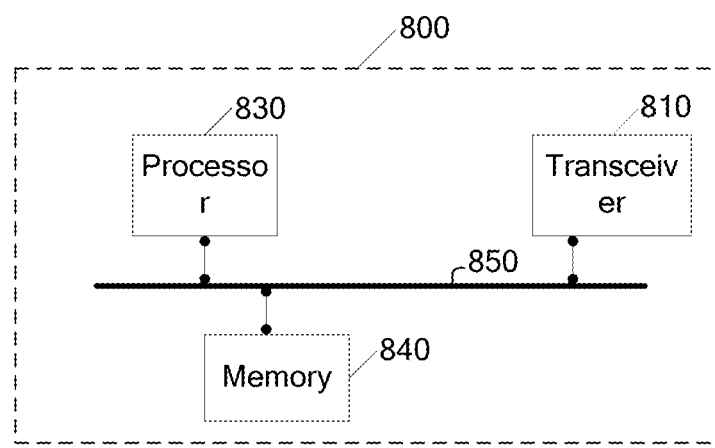
FIG. 8 is a schematic diagram of another joint channel correction apparatus according to an embodiment of the present application.

Referring to FIG. 8, an embodiment of the present application further provides a joint channel correction apparatus 800. The apparatus may include a transceiver 810, a processor 830, and a memory 840.

The transceiver 810 is configured to send a first joint channel correction instruction to a first RRU, where the first joint channel correction instruction is used to trigger the first RRU to send a first correction reference signal through X1 transmit channels in X1 traffic channels of the first RRU.

The transceiver 810 is further configured to receive a result sent by a second RRU about reception of the first correction reference signal through X2 receive channels of the second RRU.

The transceiver 810 is further configured to send a second joint channel correction instruction to the second RRU, where the second joint channel correction instruction is used to trigger the second RRU to send a second correction reference signal through X2 transmit channels in X2 traffic channels of the second RRU.

The transceiver 810 is further configured to receive a result sent by the first RRU about reception of the second correction reference signal through X1 receive channels in the X1 traffic channels.

The processor 830 is configured to obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels.

The processor 830 mainly controls operations of the joint channel correction apparatus 800. The processor 830 may also be referred to as a central processing unit (CPU). The memory 840 may include a read-only memory and a random access memory, and provide an instruction and data to the processor 830. A part of the memory 840 may further include a non-volatile random access memory. In a specific application, components of the multi-RRU joint channel correction apparatus 800 are coupled together by using a bus system 850. The bus system 850 may further include a power bus, a control bus, a status signal bus, and the like, in addition to a data bus. However, for clear description, various buses in the figure are marked as the bus system 850.

The methods disclosed by the foregoing embodiments of the present application may be applied to the processor 830, or some or all steps may be implemented by the processor 830. The processor 830 may be an integrated circuit chip, and has a signal processing capability. In an implementation process, each step of the foregoing methods may be completed by using an integrated logic circuit of hardware in the processor 830 or an instruction in a form of software. The processor 830 may be a field programmable gate array (FPGA), a digital signal processor (DSP), an application-specific integrated circuit (ASIC), a general purpose processor, or another programmable logic device, discrete gate or transistor logic device, or discrete hardware component. The processor 830 may implement or execute a part or all of the methods, steps and logical block diagrams disclosed in the embodiments of the present application. The general-purpose processor may be a microprocessor, or the processor may be any conventional processor, or the like. Steps of the methods disclosed with reference to the embodiments of the present application may be directly executed and completed by means of a hardware decoding processor, or may be executed and completed by using a combination of hardware in a decoding processor and software modules. A software module may be located in a mature storage medium in the art, such as a random access memory, a flash memory, a read-only memory, a programmable read-only memory, an electrically erasable programmable memory, or a register. The storage medium is located in the memory 840. For example, the processor 830 may read information in the memory 840 and complete the steps in the foregoing methods in combination with hardware of the processor.

The joint channel correction apparatus 800 may be a remote management device (for example, a network management server or a cloud computing center) or a switching device or a BBU, or the joint channel correction apparatus 800 is deployed in a remote management device or a switching device.

Figure 9:
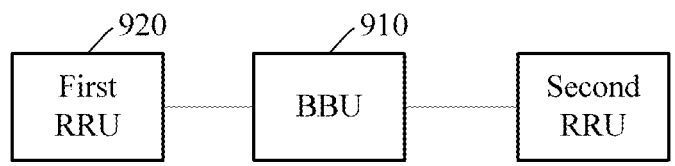
FIG. 9 is a schematic diagram of another base station according to an embodiment of the present application.

Referring to FIG. 9, an embodiment of the present application further provides a base station, including:

a baseband unit 910 and a first RRU 920.

The baseband unit 910 may be configured to: send a first joint channel correction instruction to the first RRU 920, where the first joint channel correction instruction is used to trigger the first RRU to send a first correction reference signal through X1 transmit channels in X1 traffic channels of the first RRU; send a second joint channel correction instruction to a second RRU, where the second joint channel correction instruction is used to trigger the second RRU to send a second correction reference signal through X2 transmit channels in X2 traffic channels of the second RRU; receive a result sent by the second RRU about reception of the first correction reference signal through X2 receive channels in the X2 traffic channels, and receive a result sent by the first RRU about reception of the second correction reference signal through X1 receive channels in the X1 traffic channels; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

Optionally, the first RRU and the second RRU may be RRUs serving same UE. The first RRU and the second RRU may belong to or not belong to a same base station.

For a manner in which the baseband unit 910 obtains the correction compensation coefficients of the X1 traffic channels and/or the X2 traffic channels through calculation, refer to related descriptions in the foregoing embodiment. Details are not described again herein.

Figure 10:
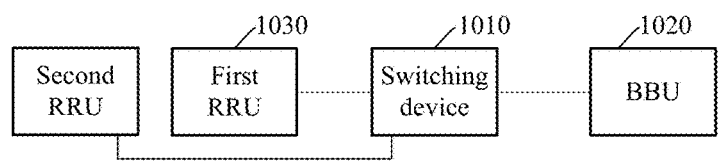
FIG. 10 is a schematic diagram of another base station according to an embodiment of the present application.

Referring to FIG. 10, an embodiment of the present application further provides a base station, including:

a switching device 1010, a baseband unit 1020, and a first RRU 1030.

The switching device 1010 is configured to: send a first joint channel correction instruction to the first RRU 1030, where the first joint channel correction instruction is used to trigger the first RRU to send a first correction reference signal through X1 transmit channels in X1 traffic channels of the first RRU; send a second joint channel correction instruction to a second RRU, where the second joint channel correction instruction is used to trigger the second RRU to send a second correction reference signal through X2 transmit channels in X2 traffic channels of the second RRU; and receive a result sent by the second RRU about reception of the first correction reference signal through X2 receive channels in the X2 traffic channels, and receive a result sent by the first RRU about reception of the second correction reference signal through X1 receive channels in the X1 traffic channels.

The baseband unit 1020 is configured to obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels, where X1 and X2 are integers greater than 1.

Optionally, the first RRU and the second RRU may be RRUs serving same UE. The first RRU and the second RRU may belong to or not belong to a same base station.

For a manner in which the baseband unit 1020 obtains the correction compensation coefficients of the X1 traffic channels and/or the X2 traffic channels through calculation, refer to related descriptions in the foregoing embodiment. Details are not described again herein.

Referring to FIG. 11, an embodiment of the present application provides an RRU 1100. The RRU may include:

a processor 1110, X1 traffic channels 1120, X1 power adjustment circuits 1130, X1 compensation circuits 1140, and X1 antennas 1150. The traffic channel 1120 is connected to the compensation circuit 1140 by the power adjustment circuit 1130, and the antenna 1150 is connected to the power adjustment circuit 1130 by the compensation circuit 1140.

The X1 traffic channels 1120 correspond to the X1 power adjustment circuits 1130 on a one-to-one basis. The X1 traffic channels 1120 correspond to the X1 compensation circuits 1140 on a one-to-one basis. The X1 traffic channels 1120 correspond to the X1 antennas 1150 one a one-to-one basis.

The processor 1110 is configured to: send a first correction reference signal through X1 transmit channels in the X1 traffic channels of the RRU; receive a result sent by a second RRU about reception of the first correction reference signal through X2 receive channels in X2 traffic channels; obtain a result about reception of a second correction reference signal through X1 receive channels in the X1 traffic channels of the RRU, where the second correction reference signal is sent by the second RRU through X2 transmit channels in the X2 traffic channels of the second RRU; and obtain correction compensation coefficients of the X1 traffic channels and/or the X2 traffic channels through calculation according to the first correction reference signal, the result about reception of the first correction reference signal through the X2 receive channels, the second correction reference signal, and the result about reception of the second correction reference signal through the X1 receive channels.

The compensation circuits 1040 are configured to perform, based on the correction compensation coefficients of the traffic channels, phase compensation or amplitude compensation for signals received or transmitted by the corresponding traffic channels.

X1 and X2 are integers greater than 1.

Optionally, in some possible implementations of the present application, for a specific implementation in which the processor 1110 calculates the correction compensation coefficients of the X1 traffic channels and/or the X2 traffic channels, refer to related descriptions in the foregoing embodiment.

The RRU 1100 and the second RRU may be RRUs serving same UE. The RRU 1100 and the second RRU may belong to or not belong to a same base station.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A joint channel correction method, comprising:
    sending, by a transceiver of a joint channel correction apparatus, a first joint channel correction instruction to a first remote radio unit (RRU) for triggering the first RRU to send a first correction reference signal through X1 transmit channels in X1 traffic channels of the first RRU;
    sending, by the transceiver of the joint channel correction apparatus, a second joint channel correction instruction to a second RRU for triggering the second RRU to send a second correction reference signal through X2 transmit channels in X2 traffic channels of the second RRU;
    receiving, by the transceiver of the joint channel correction apparatus, a result sent by the second RRU about reception of the first correction reference signal through X2 receive channels in the X2 traffic channels, and receiving a result sent by the first RRU about reception of the second correction reference signal through X1 receive channels in the X1 traffic channels; and
    obtaining, by a processor of the joint channel correction apparatus, correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels, wherein X1 and X2 are integers greater than 1.

2. The method according to claim 1, wherein:
    sending the first joint channel correction instruction to the first remote radio unit (RRU) comprises:
        sending, by a baseband unit (BBU), the first joint channel correction instruction to the first remote radio unit;
    sending the second joint channel correction instruction to the second RRU comprises:

sending, by the BBU, the second joint channel correction instruction to the second RRU;
receiving the result sent by the second RRU about reception of the first correction reference signal through X2 receive channels in the X2 traffic channels, and receiving the result sent by the first RRU about reception of the second correction reference signal through X1 receive channels in the X1 traffic channels comprises:
  receiving, by the BBU, the result sent by the second RRU about reception of the first correction reference signal through the X2 receive channels in the X2 traffic channels, and receiving the result sent by the first RRU about reception of the second correction reference signal through the X1 receive channels in the X1 traffic channels; and
obtaining correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels comprises:
  obtaining, by the BBU, the correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels.

3. The method according to claim 1, wherein:
sending the first joint channel correction instruction to the first remote radio unit (RRU) comprises:
  sending, by a switching device, the first joint channel correction instruction to the first remote radio unit;
sending the second joint channel correction instruction to the second RRU comprises:
  sending, by the switching device, the second joint channel correction instruction to the second RRU;
receiving the result sent by the second RRU about reception of the first correction reference signal through X2 receive channels in the X2 traffic channels, and receiving the result sent by the first RRU about reception of the second correction reference signal through X1 receive channels in the X1 traffic channels comprises:
  receiving, by the switching device, the result sent by the second RRU about reception of the first correction reference signal through the X2 receive channels in the X2 traffic channels, and receiving the result sent by the first RRU about reception of the second correction reference signal through the X1 receive channels in the X1 traffic channels; and
obtaining correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels comprises:
  obtaining, by a baseband unit (BBU), the correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels.

4. The method according to claim 1, wherein:
sending the first joint channel correction instruction to the first remote radio unit (RRU) comprises:
  sending, by a baseband unit (BBU), the first joint channel correction instruction to the first remote radio unit;
sending the second joint channel correction instruction to the second RRU comprises:
  sending, by the BBU, the second joint channel correction instruction to the second RRU;
receiving the result sent by the second RRU about reception of the first correction reference signal through X2 receive channels in the X2 traffic channels, and receiving the result sent by the first RRU about reception of the second correction reference signal through X1 receive channels in the X1 traffic channels comprises:
  receiving, by the BBU, the result sent by the second RRU about reception of the first correction reference signal through the X2 receive channels in the X2 traffic channels, and receiving the result sent by the first RRU about reception of the second correction reference signal through the X1 receive channels in the X1 traffic channels; and
obtaining correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels comprises:
  obtaining, by a remote management device, the correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels.

5. The method according to claim 1, wherein:
sending the first joint channel correction instruction to the first remote radio unit (RRU) comprises:
  sending, by a switching device, the first joint channel correction instruction to the first remote radio unit;
sending the second joint channel correction instruction to the second RRU comprises:
  sending, by the switching device, the second joint channel correction instruction to the second RRU;
receiving the result sent by the second RRU about reception of the first correction reference signal through X2 receive channels in the X2 traffic channels, and receiving the result sent by the first RRU about reception of the second correction reference signal through X1 receive channels in the X1 traffic channels comprises:
  receiving, by the switching device, the result sent by the second RRU about reception of the first correction reference signal through the X2 receive channels in the X2 traffic channels, and receiving the result sent by the first RRU about reception of the second correction reference signal through the X1 receive channels in the X1 traffic channels; and obtaining correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels comprises:
  obtaining, by the switching device, the correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels.

6. The method according to claim 1, wherein the X2 traffic channels are all traffic channels of the second RRU, and the X1 traffic channels are all traffic channels of the first RRU.

7. The method according to claim 1, wherein:
  the first joint channel correction instruction further indicates at least one of a time resource and a frequency resource for sending the first correction reference signal on the X1 transmit channels in the X1 traffic channels of the first RRU; and
  the second joint channel correction instruction further indicates at least one of a time resource and a frequency resource for receiving the first correction reference signal on the X2 receive channels in the X2 traffic channels of the second RRU.

8. The method according to claim 1, wherein:
  the second joint channel correction instruction further indicates at least one of a time resource and a frequency resource for sending the second correction reference signal on the X2 transmit channels in the X2 traffic channels of the second RRU; and
  the first joint channel correction instruction further indicates at least one of a time resource and a frequency resource for receiving the second correction reference signal on the X1 receive channels in the X1 traffic channels of the first RRU.

9. The method according to claim 1, wherein:
  the first joint channel correction instruction carries the first correction reference signal; or
  the second joint channel correction instruction carries the second correction reference signal.

10. The method according to claim 1, wherein the first RRU and the second RRU are RRUs serving same user equipment (UE).

11. The method according to claim 1, wherein obtaining correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels comprises:
  obtaining channel response estimated values between the X1 transmit channels and the X2 receive channels through calculation according to the first correction reference signal and the result about reception of the first correction reference signal through the X2 receive channels;
  obtaining channel response estimated values between the X2 transmit channels and the X1 receive channels through calculation according to the second correction reference signal and the result about reception of the second correction reference signal through the X1 receive channels; and
  obtaining the correction compensation coefficients of the X1 traffic channels or the X2 traffic channels through calculation according to the channel response estimated values between the X1 transmit channels and the X2 receive channels and the channel response estimated values between the X2 transmit channels and the X1 receive channels.

12. The method according to claim 11, wherein the channel response estimated values are expressed by using the following formula:

$$H_{RRU_iRx_k\text{-}RRU_jTx_m} = H_{RRU_iRx_k} H_{RRU_iRx_k\text{-}RRU_jTx_m}^{Air} H_{RRU_jTx_m},$$

where
  $H_{RRU_iRx_k\text{-}RRU_jTx_m}$ indicates a channel response estimated value between a receive channel in a $k^{th}$ traffic channel of an $i^{th}$ RRU and a transmit channel in an $m^{th}$ traffic channel of a $j^{th}$ RRU;
  $H_{RRU_iRx_k\text{-}RRU_jTx_m}$ indicates a channel response estimated value on an air interface between the receive channel in the $k^{th}$ traffic channel of the $i^{th}$ RRU and the transmit channel in the $m^{th}$ traffic channel of the $j^{th}$ RRU; and
  $H_{RRU_iRx_k}$ indicates a channel response estimated value of the receive channel in the $k^{th}$ traffic channel of the $i^{th}$ RRU, and $H_{RRU_jTx_m}$ indicates a channel response estimated value of the transmit channel in the $m^{th}$ traffic channel of the $j^{th}$ RRU.

13. The method according to claim 1, wherein at least one of the first RRU and the second RRU has no self-correction function.

14. A joint channel correction apparatus, comprising:
  a transceiver, configured to:
    send a first joint channel correction instruction to a first remote radio unit (RRU) for triggering the first RRU to send a first correction reference signal through X1 transmit channels in X1 traffic channels of the first RRU,
    send a second joint channel correction instruction to a second RRU for triggering the second RRU to send a second correction reference signal through X2 transmit channels in X2 traffic channels of the second RRU, and
    receive a result sent by the second RRU about reception of the first correction reference signal through X2 receive channels in the X2 traffic channels, and receive a result sent by the first RRU about reception of the second correction reference signal through X1 receive channels in the X1 traffic channels; and
  a processor, configured to obtain correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels, wherein X1 and X2 are integers greater than 1.

15. The apparatus according to claim 14, wherein:
  the first joint channel correction instruction further indicates at least one of a time resource and a frequency resource for sending the first correction reference signal on the X1 transmit channels in the X1 traffic channels of the first RRU; and the second joint channel correction instruction further indicates at least one of a time resource and a frequency resource for receiving the first correction reference signal on the X2 receive channels in the X2 traffic channels of the second RRU.

16. The apparatus according to claim 14, wherein:
the second joint channel correction instruction further indicates at least one of a time resource and a frequency resource for sending the second correction reference signal on the X2 transmit channels in the X2 traffic channels of the second RRU; and
the first joint channel correction instruction further indicates at least one of a time resource and a frequency resource for receiving the second correction reference signal on the X1 receive channels in the X1 traffic channels of the first RRU.

17. The apparatus according to claim 14, wherein the first RRU and the second RRU are RRUs serving same UE.

18. The apparatus according to claim 14, wherein the processor is configured to:
obtain channel response estimated values between the X1 transmit channels and the X2 receive channels through calculation according to the first correction reference signal and the result about reception of the first correction reference signal through the X2 receive channels;
obtain channel response estimated values between the X2 transmit channels and the X1 receive channels through calculation according to the second correction reference signal and the result about reception of the second correction reference signal through the X1 receive channels; and
obtain the correction compensation coefficients of the X1 traffic channels or the X2 traffic channels through calculation according to the channel response estimated values between the X1 transmit channels and the X2 receive channels and the channel response estimated values between the X2 transmit channels and the X1 receive channels.

19. The apparatus according to claim 18, wherein the channel response estimated values are expressed by using the following formula:

$$H_{RRU_iRx_k\text{-}RRU_jTx_m} = H_{RRU_iRx_k} H_{RRU_iRx_k\text{-}RRU_jTx_m}^{Air} H_{RRU_jTx_m},$$

where
$H_{RRU_iRx_k\text{-}RRU_jTx_m}$ indicates a channel response estimated value between a receive channel in a $k^{th}$ traffic channel of an $i^{th}$ RRU and a transmit channel in an $m^{th}$ traffic channel of a $j^{th}$ RRu;
$H_{RRU_iRx_k\text{-}RRU_jTx_m}^{Air}$ indicates a channel response estimated value on an air interface between the receive channel in the $k^{th}$ traffic channel of the $i^{th}$ RRU and the transmit channel in the $m^{th}$ traffic channel of the $j^{th}$ RRU; and
$H_{RRU_iRx_k}$ indicates a channel response estimated value of the receive channel in the $k^{th}$ traffic channel of the $i^{th}$ RRU, and $H_{RRU_jTx_m}$ indicates a channel response estimated value of the transmit channel in the $m^{th}$ traffic channel of the $j^{th}$ RRU.

20. A communications system, comprising:
a remote management device, a first remote radio unit (RRU), and a second RRU, wherein:
the remote management device is configured to:
send a first joint channel correction instruction to the first RRU to trigger the first RRU to send a first correction reference signal through X1 transmit channels in X1 traffic channels of the first RRU;
send a second joint channel correction instruction to the second RRU to trigger the second RRU to send a second correction reference signal through X2 transmit channels in X2 traffic channels of the second RRU;
receive a result sent by the second RRU about reception of the first correction reference signal through X2 receive channels in the X2 traffic channels, and receive a result sent by the first RRU about reception of the second correction reference signal through X1 receive channels in the X1 traffic channels; and
obtain correction compensation coefficients of the X1 traffic channels or the X2 traffic channels through calculation according to the first correction reference signal, the result about reception of the first correction reference signal through the X2 receive channels, the second correction reference signal, and the result about reception of the second correction reference signal through the X1 receive channels, wherein X1 and X2 are integers greater than 1.

* * * * *